United States Patent
Jamtvedt et al.

(10) Patent No.: US 9,278,308 B2
(45) Date of Patent: Mar. 8, 2016

(54) CONSTRUCTION ELEMENT FOR $CO_2$ CAPTURE

(75) Inventors: Svein Jamtvedt, Stathelle (NO); Harry Øysæd, Stathelle (NO); John Ole Gjerp, Oslo (NO); Frank Henning Forsberg, Oslo (NO)

(73) Assignee: Aker Engineering & Technology AS, Lysaker (NO)

( * ) Notice: Subject to any disclaimer, the term of this patent is extended or adjusted under 35 U.S.C. 154(b) by 139 days.

(21) Appl. No.: 14/129,364

(22) PCT Filed: Jul. 5, 2012

(86) PCT No.: PCT/EP2012/063185
§ 371 (c)(1),
(2), (4) Date: Dec. 26, 2013

(87) PCT Pub. No.: WO2013/004797
PCT Pub. Date: Jan. 10, 2013

(65) Prior Publication Data
US 2014/0123851 A1    May 8, 2014

(30) Foreign Application Priority Data
Jul. 5, 2011   (NO) .................................. 20110971

(51) Int. Cl.
*B01D 53/18* (2006.01)
*B32B 13/12* (2006.01)
(Continued)

(52) U.S. Cl.
CPC ............ *B01D 53/18* (2013.01); *B01D 53/1456* (2013.01); *B01D 53/1475* (2013.01);
(Continued)

(58) Field of Classification Search
CPC ............... B01D 53/18; B01D 53/1456; B01D 53/1475; B01D 2252/204; B01D 2257/504; B05D 7/222; B29C 47/0004; B32B 13/12; B32B 15/085; F16L 58/1009; Y02C 10/06
USPC ........ 95/149, 236; 96/290; 261/114.5, 75, 19; 264/176.1; 427/230; 423/228, 229
See application file for complete search history.

(56) References Cited

U.S. PATENT DOCUMENTS 7,585,479 B2    9/2009  Carrette et al.
2006/0156923 A1  7/2006  Meckl et al.
(Continued)

FOREIGN PATENT DOCUMENTS

DE    2105859 A1   10/1971
DE    3820434 A1   12/1989
(Continued)

OTHER PUBLICATIONS

Machine-generated English translation of JP 09-262930 A, published Oct. 1997.*
(Continued)

*Primary Examiner* — Frank Lawrence
(74) *Attorney, Agent, or Firm* — Winstead PC

(57) ABSTRACT

A construction element for a plant for capture of an acidic gas using an aqueous amine absorbent, wherein at least a part of a surface of said element comprises a polyolefin, and a hydrolytically stable antioxidant, is described. Additionally, a liner comprising said polyolefin and the hydrolytically stable antioxidant, is described. The construction element may be a column, a pipe, an insert, like a column packing element or a tray. An apparatus for capturing $CO_2$ using the construction elements, is also described.

13 Claims, 25 Drawing Sheets

(51) Int. Cl.
| | |
|---|---|
| *B32B 15/085* | (2006.01) |
| *F16L 58/10* | (2006.01) |
| *B01D 53/14* | (2006.01) |
| *B05D 7/22* | (2006.01) |
| *B29C 47/00* | (2006.01) |
| *B32B 1/08* | (2006.01) |

(52) U.S. Cl.
CPC ............ *B05D 7/222* (2013.01); *B29C 47/0004* (2013.01); *B32B 1/08* (2013.01); *B32B 13/12* (2013.01); *B32B 15/085* (2013.01); *F16L 58/1009* (2013.01); *B01D 2252/204* (2013.01); *B01D 2257/504* (2013.01); *B32B 2597/00* (2013.01); *Y02C 10/06* (2013.01)

(56) References Cited

U.S. PATENT DOCUMENTS

| | | | |
|---|---|---|---|
| 2010/0029466 | A1 | 2/2010 | Woodhouse |
| 2011/0094379 | A1* | 4/2011 | Cordatos .......................... 95/51 |

FOREIGN PATENT DOCUMENTS

| | | | |
|---|---|---|---|
| DE | 102009013757 | A1 | 9/2010 |
| EP | 0657684 | A1 | 6/1995 |
| JP | 09-262930 | A * | 10/1997 |
| WO | WO-2004108244 | A2 | 12/2004 |
| WO | WO-2008/063079 | A2 | 5/2008 |
| WO | WO-2008/108657 | A1 | 9/2008 |
| WO | WO-2008/130244 | A1 | 10/2008 |
| WO | WO-2009035340 | A1 | 3/2009 |
| WO | WO-2009/108064 | A1 | 9/2009 |
| WO | WO-2010102877 | A1 | 9/2010 |
| WO | WO-2010/142716 | A1 | 12/2010 |

OTHER PUBLICATIONS

Moser, P. et al., "Material Testing for Future Commercial Post-Combustion Capture Plants-Results of the Testing Programme Conducted at the Niederaussem Pilot Plant", Energy Procedia 4, 2011, pp. 1317-1322.

Fourgeaud, D., "International Search Report" for PCT/EP2012/063185, as mailed Sep. 13, 2012, 4 pages.

Reijerkerk S.R., et al., "Tuning of mass transport properties of multi-block copolymers for CO2 capture applications", Journal of Membrane Science, Elsevier Scientific Publ. Company, Amsterdam, NL, vol. 359, No. 1-2, Sep. 1, 2010, pp. 54-63.

Horrocks, A.R., et al., "The effects of stress, environment and polymer variables on the durabilities of oriented polypropylene tapes", Polymer Degradation and Stability, Barking, GB, Jan. 1, 1994, vol. 46, No. 2, pp. 181-194.

Thörnblom, K, et al., "The extractability of phenolic antioxidants into water and organic solvents from polyethylene pipe materials—Part 1", Polymer Degradation and Stability, Barking, GB, Jul. 28, 2011, vol. 96, No. 10, pp. 1751-1760.

Geertz, G., et al., "Stabiliser diffusion in long-term pressure tested polypropylene pipes analysed by IR microscopy", Polymer Degradation and Stability, Barking, GB, Jul. 1, 2009, vol. 94, No. 7, pp. 1092-1102.

Müller, W.W., et al., "Antioxidant depletion and OIT values of high impact PP strands", Chinese Jouornal of Polymer Science, 2009, vol. 27, pp. 435-445.

* cited by examiner

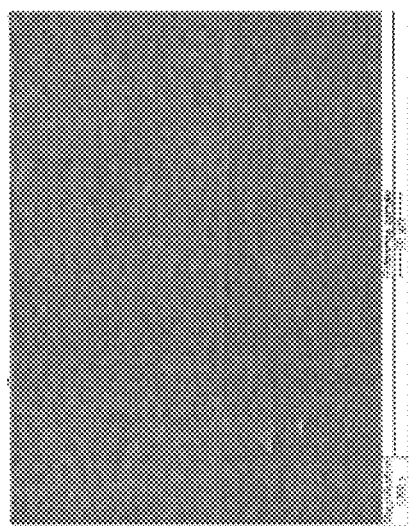
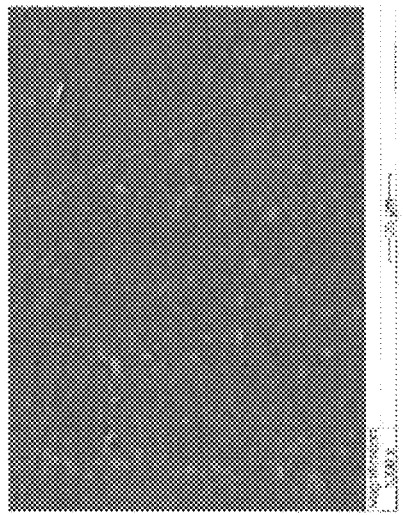
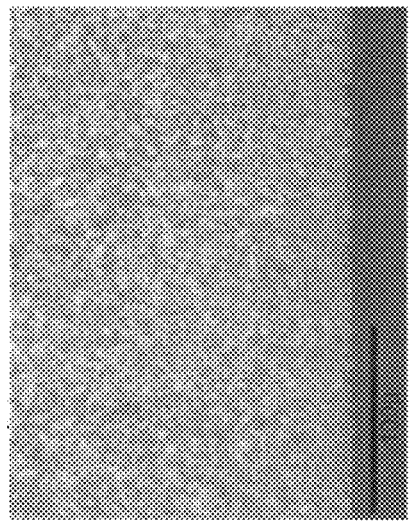
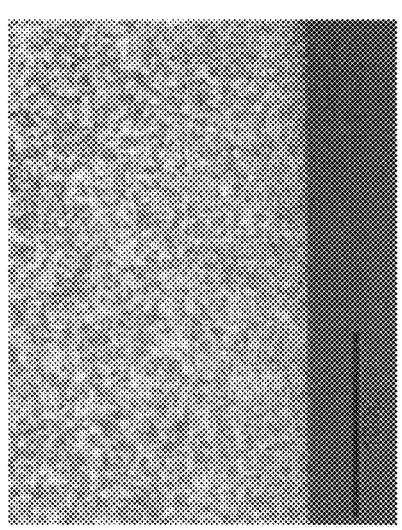
Fig. 4a
Fig. 4b

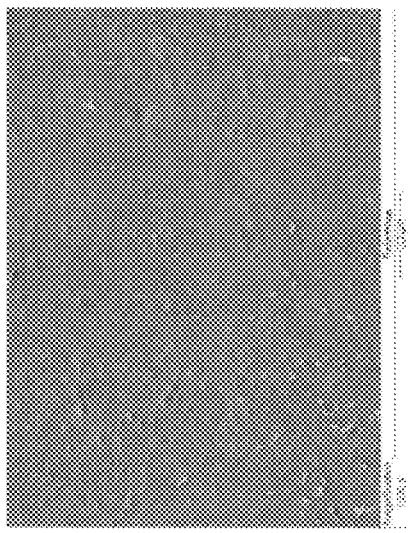
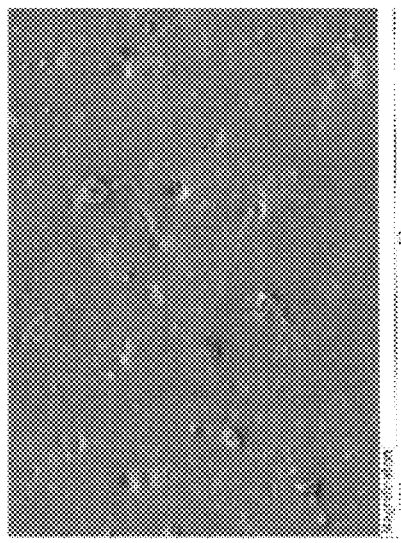
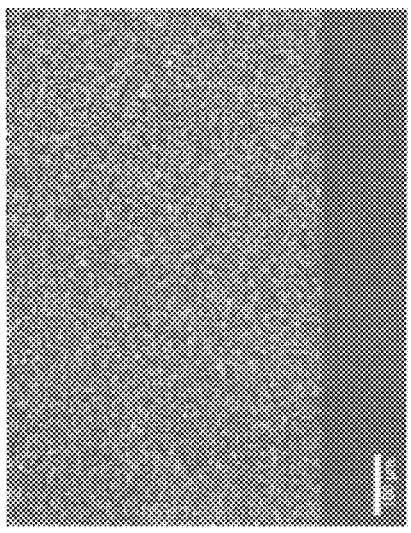
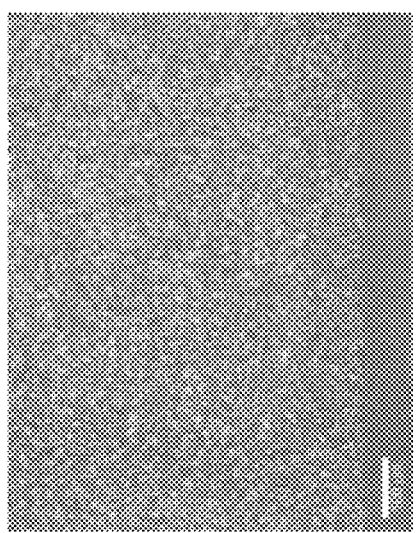
Fig. 8a
Fig. 8b

CONSTRUCTION ELEMENT FOR CO$_2$ CAPTURE

TECHNICAL FIELD

The present invention relates to a building element for capture of acidic gases, e.g. CO$_2$, to a liner and inserts for use in the column and to an apparatus comprising the column, liner or inserts. The invention also concerns piping for use in methods of capturing acidic gases, e.g. CO$_2$ as well as to methods of capturing acidic gases, e.g. CO$_2$, using the aforementioned columns, liners and inserts.

BACKGROUND ART

The continually increasing combustion of fossil fuel, such as coal, natural gas, and oil, has resulted in a dramatic increase in the concentration of CO$_2$ in the atmosphere. There is overwhelming evidence that the greenhouse effect is at least partly caused by this increased CO$_2$ concentration and that this has already contributed to the climate changes that have occurred over the last decades. According to simulation models, it is suspected to cause further and potentially more dramatic changes in the climate in the future.

As a result, scientists, environmentalists and politicians throughout the world are driving initiatives to reduce the amount of CO$_2$ discharged into the atmosphere by combustion of fossil fuel. One approach being adopted is to capture CO$_2$ (i.e. prevent the release of CO$_2$) from the exhaust gases, e.g. from thermal power plants, before they are released to the atmosphere. The captured CO$_2$ may be injected into subterranean formations such as aquifers, oil wells for enhanced oil recovery or in depleted oil and gas wells for deposition since tests indicate that CO$_2$ remains in the subterranean formation for thousands of years and is not released back into the atmosphere.

The most common CO$_2$ capture processes are based on the CO$_2$-containing gas mixture being introduced, in counter flow, to an aqueous absorbent in an absorber column. The gas leaving the absorber column is CO$_2$ depleted. The CO$_2$ leaves the absorber column together with the absorbent. Typically the absorbent is subsequently regenerated in a regenerator column and returned to the absorber column. The CO$_2$ separated from the absorbent is sent for storage, e.g. in a subterranean formation.

Several types of aqueous absorbents are utilised in carbon capture processes including amines, carbonates and amino acid salts.

The currently preferred absorbents for use in these processes are, however, aqueous solutions of different amines. The amines used for the CO$_2$ capture, and also the fluids used for emission control and flue gas treatment, however, interact with several of the materials most commonly used in the construction of equipment that is used in the CO$_2$ capture process. For instance the amines may cause corrosion or degradation of the equipment material, particularly the columns, its inserts and piping where the amines are present in significant amounts and at relatively high temperatures.

Polyolefin materials, e.g. polypropylene and polyethylene, are generally very resistant against amines at low and moderate temperatures, and may be used in contact with amines either alone or as liners on less resistant substrates of e.g. steel, concrete, or composite materials. For application in CO$_2$ capture plants, the required service lifetime of a liner is more than 30 years at temperatures up to 80° C. and in amine solution (e.g. 30% monoethanolamine (MEA) in water or similar concentrations of other amines or mixtures of amines).

EP 0657684 A (KERAMCHEMIE GMBH) 14 Jun. 1995 describes construction part for chemical plants where a liner is provided at metal surfaces as corrosion coating, where the liner has a layered structure comprising an inner resin layer fastened to a supporting metal body, and where the inner layer is protected by one or more outer layers, of which the outer layer is a non-diffusive rubber layer.

DE 2105859 A (FRACTIONATION RESEARCH LTD) 7 Oct. 1971 relates to building elements for chemical process plants made of high temperature polypropylene without any metal organic compounds at least in the surface layer. Said building elements are said to be resistant to water and many chemicals.

DE 3820434 A (LINDE AG) 21 Dec. 1989 relates to an absorption column having a packing comprising packing elements made of polymers such as polypropylene or polyethylene. Nothing is said about the nature of the polymers, or their use as a liner.

DE 102009013757 A (LINDE AG) 29 Sep. 2010 describes an absorption column for CO$_2$ capture including a packing of synthetic material, such as plastic. Nothing is discovered about the nature of the synthetic material.

US 2006/0156923 A (BASF AG) 20 Jul. 2006 discloses the idea of using a polypropylene liner in an inert scrubbing column for deacidifying acid gases. Additionally, MOSER, Peter, et al. Material Testing for Future Commercial Post-Combustion Capture Plants. *Energy Procedia*. September 2011, vol.4, p.1317-1322. tests the performance of a concrete module lined with polypropylene in a flow line returning absorbent to an absorption column. No details about the nature of the polypropylene are, however, revealed in either publication.

MÜLLER, Werner W., et al. Antioxidant depletion and oit values of high impact PP strands. *Chinese Journal of Polymer Science*. 2009, vol. 27, no. 3, p. 435-445. relates to a study of depletion of different antioxidants in polypropylene (PP) during immersion in water, and inversion of water combined with air oven aging. There is, however, no mentioning of the effects of aqueous solutions as such, or more specifically aqueous amine solutions used as CO$_2$ absorbents on the antioxidants, or on the PP including the antioxidants.

The requirements for the lifetime, or service life, of the construction elements in contact with aqueous amine solutions in a plant for CO$_2$ capture, such as columns, tanks, piping, packing etc, is 30 years. Depletion of antioxidants used to stabilize polyolefins under exposure for the operating conditions the building element comprising a polyolefin will be exposed to, is an indication on the lifetime for the polyolefin. Testing under temperatures higher than the expected operating temperature until degradation or mechanical breakdown of the polyolefin material, is an accepted accelerated test, that can give a better indication on the lifetime.

The tests described by Müller et al, see table 3, indicates that antioxidants as Irganox 1010 and Irganox 1330 are depleted within 120 days in water bath at 90° C., and 301 days at 90° C. Even though it is indicated that for the antioxidant Irganox 1330, OIT values during aging changed slower than the reduction of antioxidant concentration in the polymer, the lifetime for a polyolefin stabilized with Irganox 1330 assumed from the data provided by Müller et al, is far shorter than 30 years. The skilled person reading Müller et al would conclude that other antioxidants different from Irganox 1330 had to be used to provide the required lifetime.

Candidate material, beta (b)-PP BE60-7032 from Borealis AS and, sold by Steuler, as a corrosion resistant polymer, was subjected to long term testing under conditions representative for the conditions in a $CO_2$ absorption column. It was found not to have the required long term resistance to the absorbent. This testing is shown in the examples section.

Hence, there is a need to develop more resistant materials for long term operation for constructing equipment for use in $CO_2$ capture plants. Further goals for the present invention will be apparent for the skilled person in reading the description.

DISCLOSURE OF INVENTION

According to a first embodiment, the present invention relates a A construction element for a plant for capture of an acidic gas using an aqueous amine absorbent, wherein at least a part of a surface of said element comprises a polyolefin, wherein the polyolefin composition comprises a hydrolytically stable antioxidant stable in amine solutions, of formula (I) or (II),

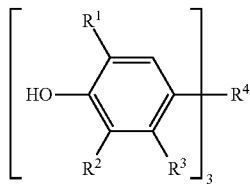

(I)

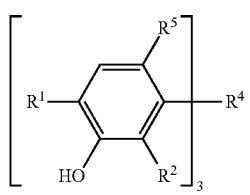

(II)

wherein $R^1$ is $C_{1-18}$ alkyl, $C_{5-12}$ cycloalkyl, phenyl or $C_{7-9}$ phenylalkyl;

$R^2$ is hydrogen, $C_{1-18}$ alkyl, $C_{5-12}$ cycloalkyl, phenyl or $C_{7-9}$ phenylalkyl;

$R^3$ is hydrogen or methyl;

$R^4$ is (a), (b), (c) or (d)

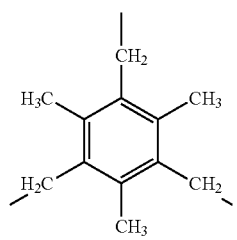

(a)

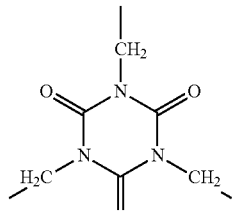

(b)

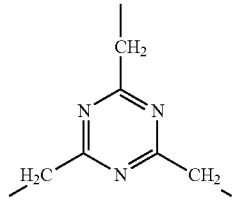

(c)

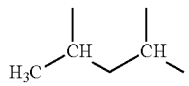

(d)

and $R^5$ is hydrogen or phenyl.

Polyolefins stabilized by the identified group or antioxidants, have been shown in tests to be very promising for long term use for constructing building elements for plants for $CO_2$ capture, as the tests indicates that these polymers may have a lifetime of 30 years or more in the extremely challenging environment found inside the columns, pipes etc of such plants.

An especially preferred antioxidant is 1,3,5-tri-methyl-2, 4,6-tris-(3,5-di-tert. butyl-4-hydroxyphenyl)benzene. This antioxidant has been extensively tested after giving preliminary promising results.

According to one embodiment, the polymer of the construction element further comprises a heat stable antioxidant as defined n claims 3 or 4.

The polyolefin may be a polypropylen polymer, such as a ploypropylen homopolymer, optionally comprising a beta-crystalline phase. Alternatively, the polyolefin may be an ethylene polymer.

According to one embodiment, synthetic hydrotalcite is added to polymer mixture. Hydrotalcite is assumed to have a positive effect on the lifetime of a polyolefin in amine solutions at the operating temperatures of a $CO_2$ capture plant. Further testing is performed to confirm the assumption.

According to one embodiment, the surface of the building element expected to being exposed to the aqueous amine absorbent, amine vapour and/or steam is coated with said polyolefin composition. Alternatively, the surface of the building element expected to being exposed to aqueous amine solution, vapour thereof or steam is a liner comprising said polyolefin composition which is fixed to the surface of the construction element. The coating or the liner will according to these embodiments, protect the underlying structures from exposure to amine solutions. Aqueous amine solutions are extremely corrosive and by protecting the underlying structure with a polymer coating or a polymer liner according to the present invention, materials that are not resistant to corrosion by the amine solution are protected from exposure, making it possible to use simpler and less expensive materials for building of the plant.

Examples on construction elements according to the present invention are an absorption column, a desorption column, a tube, a liner, a tray, or a column packing element. All of said elements are exposed to hot amine solutions and a coating or liner comprising the present polyolefin mixture may be beneficial.

BRIEF DESCRIPTION OF DRAWINGS

FIG. 4 shows microscopic images of an (a) unaged and (b) aged sample of commercially available PP material

FIGS. 8a-c show microscopic images of an unaged and aged sample of plates of polyolefin composition used in the present invention

DETAILED DESCRIPTION

Definitions

Figure 1:
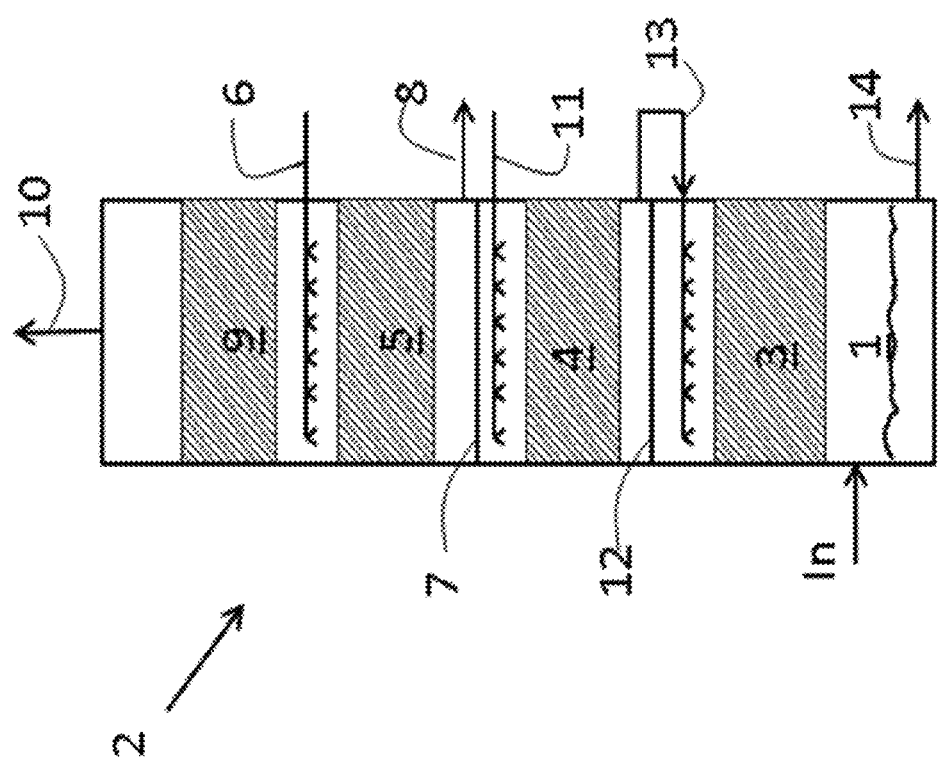
FIG. 1 is a schematic diagram of an absorption column

By the term construction element is meant any element forming a part of a plant according to the present invention that is in contact with aqueous amine solutions, and/or steam and amine vapour, such as columns, tubing, packing elements for columns and the like, etc.

By the term column is meant any elongated structure having a body, at least one inlet and at least one outlet. The column may be any shape, e.g. cylindrical or oblong.

By the term "acidic gas" is meant a gas which when dissolved in water produces a pH of less than 7.

By the term "polyolefin" is meant herein a polymer that comprises units derived from an alkene. Preferred polyolefins are $C_2$ and $C_3$ polyolefins which comprise units derived from ethylene and/or propylene respectively.

By the term "ethylene polymer" is meant herein a polymer that comprises at least 50 mol % units derived from ethylene.

By the term "propylene polymer" is meant herein a polymer that comprises at least 50 mol % units derived from propylene.

The terms "ethylene homopolymer" and "propylene homopolymer" are intended to encompass polymers which consist essentially of repeat units deriving from ethylene or propylene respectively. Homopolymers may, for example, comprise at least 99%, e.g. 100%, by weight of repeat units deriving from ethylene or propylene as appropriate.

The term "ethylene copolymer" is intended to encompass polymers comprising repeat units from ethylene and at least one other monomer. In typical copolymers at least 1%, more preferably at least 2% by weight of repeat units derive from at least one monomer other than ethylene.

The term "propylene copolymer" is intended to encompass polymers comprising repeat units from propylene and at least one other monomer. In typical copolymers at least 1%, more preferably at least 2% by weight of repeat units derive from at least one monomer other than propylene.

By the term "antioxidant" is meant an agent which is able to inhibit radical reactions in a polyolefin and thus prevent degradation processes.

By the term "hydrolytically stable antioxidant" is meant an antioxidant that has a half-life of at least 3 years at pH7 at 25° C. (EPIWIN HYDROWIN program v1.67).

Acidic Gas

The acidic gas may be, for example, $CO_2$, $H_2S$, $SO_2$, $CS_2$, HCN, COS, $NO_2$ or mercaptans. Most often, however, the acidic gas will be $CO_2$. The gas is generally present in the exhaust from oxidation reactions such as the combustion of coal, organic waste or oil.

Aqueous Amine Absorbent

The aqueous amine absorbent used to capture the acid gases, may be comprise an aqueous solution of any amine that are proposed or have been used for capture of acid gases, such as $CO_2$. Examples on amines suggested for capture of acid gases may be found i.a. in U.S. Pat. No. 7,585,479 B (INSTITYTE FRANCAIS DU PETROE) 08. Aug. 2009. Exemplary amines that are tested in relation to the present invention are AMP (2-amino-2-methyl-1-propanol), AEP (aminoethyl) piperazine), MEA (monoethanolamine), piperazine, and combinations thereof.

Polyolefin

Preferably the polyolefin is an ethylene polymer or a propylene polymer, more preferably a propylene polymer.

Propylene Polymer Properties

Propylene polymer present in the composition used in the invention preferably comprises at least 80 mol % units derived from propylene. Still more preferably the propylene polymer comprises at least 95 mol % units, especially preferably at least 99 mol % units derived from propylene (e.g. 97 to 99.9 mol % units derived from propylene).

The propylene polymer may comprise units from one or more other monomers. Units may, for example, be present that derive from a-olefins having 2 or 4-10 carbon atoms. Examples of suitable monomers include ethylene, but-1-ene, pent-1-ene, hex-1-ene and oct-1-ene. Ethylene and butene are preferred.

Preferred propylene polymers comprise less than 40 mol % of units deriving from a-olefin having 2 or 4-10 carbon atoms. Still further preferred propylene polymers comprise less than 20 mol %, especially preferably less than 10 mol %, e.g. less than 5 mol % of units deriving from a-olefin having 2 or 4-10 carbon atoms. Particularly preferred propylene polymers consist essentially (e.g. consist of) units derived from propylene.

Still more preferably the propylene polymer is a homopolymer. Propylene homopolymer has excellent chemical resistance as well as high thermal resistance. It is thus preferred for use in the present invention.

The propylene polymer preferably has a density of 855 to 946 kg/m$^3$, more preferably 900 to 920 kg/m$^3$, still more preferably 902 to 905 kg/m$^3$.

The propylene polymer preferably has a melt flow rate (MFR2) in the range 0.01 to 100 g/10 min, preferably 0.05 to 20 g/10 min, more preferably 0.1 to 2 g/10 min. Preferably the melt flow rate (MFR2) of the propylene polymer is less than 2 g/10 min.

The propylene polymer preferably has a melting point in the range 130 to 171° C., more preferably 140 to 165° C., still more preferably 140 to 150° C. (e.g. around 150 to 165° C.).

The propylene polymer is preferably partially crystalline, e.g. having a crystallinity of the order of 30 to 70%, e.g. 45 to 60%. Particularly preferably the propylene polymer comprises a beta-crystalline phase. Preferably 30-100%, more preferably greater than 50%, still more preferably greater than 80% of the crystalline phase present in the final product is in the beta-form. The presence of crystals in the beta-form has been found to improve the chemical resistance of the polymer.

The propylene polymer used in the invention is preferably homogeneous in structure (e.g. gel free). Preferably the propylene polymer is soluble in decalin at 135° C. Preferably the molecular weight distribution (MWD) of the propylene polymer is in the range 2 to 20, more preferably 2.5 to 8, still more preferably 3 to 7, e.g. about 3.5 to 6.5.

The propylene polymer may be unimodal or multimodal (e.g. bimodal) with respect to molecular weight distribution. The molecular weight profile of a multimodal polymer does not consist of a single peak but instead comprises the combination of two or more peaks (which may or may not be distinguishable) centred about different average molecular weights as a result of the fact that the polymer comprises two or more separately produced components.

When the propylene polymer is multimodal, its components may be propylene homopolymers or propylene copolymers. Preferably, however, in such polymers the propylene polymer components are different copolymers. In multimodal propylene polymers at least 20 wt %, more preferably at least 30 wt %, still more preferably at least 40 wt % of each propylene component (e.g. homopolymer and copolymer) is present based on the total weight of the polymer.

Preferably the propylene polymer of the present invention is unimodal with respect to molecular weight distribution.

Suitable propylene polymers for use in the invention are commercially available. For example, b-PP BE60-7032 is commercially available from Borealis AS.

Alternatively propylene polymer may be prepared by polymerisation processes known in the art.

Ethylene Polymer Properties

Ethylene polymer present in the composition of the invention preferably comprises at least 80 mol % units derived from ethylene. Still more preferably the ethylene polymer comprises at least 95 mol % units, especially preferably at least 99 mol % units derived from ethylene (e.g. 97 to 99.9 mol % units derived from ethylene).

The ethylene polymer may comprise units from one or more other monomers. Units may, for example, be present that derive from a-olefins having 3-10 carbon atoms. Examples of suitable monomers include propylene, but-1-ene, pent-1-ene, hex-1-ene and oct-1-ene. Propylene and butene are preferred.

Preferred ethylene polymers comprise less than 40 mol % of units deriving from a-olefin having 3-10 carbon atoms. Still further preferred ethylene polymers comprise less than 20 mol %, especially preferably less than 10 mol %, e.g. less than 5 mol % of units deriving from a-olefin having 3-10 carbon atoms. Particularly preferred ethylene polymers consist essentially (e.g. consist of) units derived from ethylene.

Still more preferably the ethylene polymer is a homopolymer.

The ethylene polymer preferably has a density of 925 to 970 kg/m$^3$, more preferably 940 to 965 kg/m$^3$, still more preferably 960 to 965 kg/m$^3$.

The ethylene polymer preferably has a melt flow rate (MFR2) in the range 0.0001 to 50 g/10 min, preferably 0.001 to 10 g/10 min, more preferably 0.005 to 1 g/10 min. Preferably the melt flow rate (MFR2) of the ethylene polymer is less than 0.5 g/10 min.

The ethylene polymer preferably has a melt flow rate (MFR5) in the range 0.001 to 200 g/10 min, preferably 0.01 to 50 g/10 min, more preferably 0.05 to 5 g/10 min. Preferably the melt flow rate (MFR5) of the ethylene polymer is less than 1 g/10 min.

The ethylene polymer preferably has a melting point of greater than 110° C., more preferably greater than 120° C., still more preferably greater than 125° C. (e.g. around 128 to 132° C.). The maximum melting point of the ethylene polymer may be 150° C.

The ethylene polymer is also preferably partially crystalline, e.g. having a crystallinity of the order of 40 to 80%, e.g. 60 to 70%.

The ethylene polymer of the invention is preferably homogeneous in structure (e.g. gel free). Preferably the ethylene polymer is soluble in decalin at 135° C. Preferably the MWD of the ethylene polymer is in the range 2 to 20, more preferably 3 to 10, still more preferably 3.5 to 8, e.g. about 4 to 7.

The ethylene polymer may be unimodal or multimodal (e.g. bimodal) with respect to molecular weight distribution. The molecular weight profile of a multimodal polymer does not consist of a single peak but instead comprises the combination of two or more peaks (which may or may not be distinguishable) centred about different average molecular weights as a result of the fact that the polymer comprises two or more separately produced components.

When the ethylene polymer is multimodal, its components may be ethylene homopolymers or ethylene copolymers. Preferably, however, in such polymers the ethylene polymer components are different copolymers. In multimodal ethylene polymers at least 20 wt %, more preferably at least 30 wt %, still more preferably at least 40 wt % of each ethylene component (e.g. homopolymer and copolymer) is present based on the total weight of the polymer.

Preferably the ethylene polymer of the present invention is multimodal with respect to molecular weight distribution.

Suitable ethylene polymers for use in the invention are commercially available. For example, BS2581 is commercially available from Borealis AS. Alternatively ethylene polymer may be prepared by polymerisation processes known in the art.

Mechanical Properties of the Polyolefin

The mechanical properties of the polyolefin used in the present invention are preferably as follows:

The tensile modulus (1 mm/min) of the polyolefin (e.g. ethylene or propylene polymer) is preferably in the range 500-5000 MPa, more preferably 800-3000 MPa, still more preferably 1000-2000 MPa. The tensile strain at yield (50 mm/min) of the polyolefin is preferably in the range 2-25%, more preferably 5 to 15%, still more preferably 8-12%. The tensile stress at yield (50 mm/min) of the polyolefin is preferably in the range 5-100 MPa, more preferably 15-50 MPa, still more preferably 20-40 MPa.

The heat deflection temperature (Method B—0.45 MPa) of the polyolefin (e.g. ethylene or propylene polymer) is preferably in the range 70-150° C., more preferably 80-130° C., still more preferably 90-120° C.

The Vicat softening temperature A50 (10N) of the polyolefin (e.g. ethylene or propylene polymer) is preferably in the range 80-170° C., more preferably 100-165° C., still more preferably 120-160° C.

The Charpy Impact strength, notched (23° C.) of the polyolefin (e.g. ethylene or propylene polymer) is preferably in the range 1-100 $kJ/m^2$, more preferably 25-75 $kJ/m^2$, still more preferably 40-60 $kJ/m^2$.

The Charpy Impact strength, notched (–20° C.) is preferably in the range 1-10 $kJ/m^2$, more preferably 2.5-7.5 $kJ/m^2$, still more preferably 4-6 $kJ/m^2$ for propylene polymer and in the range 1-40 $kJ/m^2$, more preferably 5-35 $kJ/m^2$, still more preferably 10-30 $kJ/m^2$ for ethylene polymer.

Stabilisation of Polyolefin

Polyolefins readily undergo reactions with oxygen. Such oxidation reactions are of vital interest as the result may be molecular chain scission and as a result reduced mechanical properties. Technically such oxidation reactions are often referred to as degradation of polyolefins.

Degradation of polymers may be influenced both chemically (e.g. by water, acids, amines and oxygen etc) and physically (e.g. by heat, UV-light, high energetic irradiation or mechanical energy). The main factors determining the degree of polyolefin degradation during service lifetime are temperature, environment and polyolefin stabilization. The polyolefins used in the present invention are exposed to aqueous solutions of amines, such as MEA, at temperatures of 60-100° C. for prolonged periods of time, ideally 30 years. This exposure places a high demand on the resistance of the polymer to degradation.

The service lifetime of the polyolefin used in the present invention is significantly improved by employing a particular antioxidant, and especially by using a specific combination of antioxidants and stabilisers. Without wishing to be bound by theory, it is believed that the service lifetime of the polyolefin used in the present invention is mainly determined by the antioxidants and stabilisers added thereto. Thus it is hypothesised that until the antioxidants/stabilisers have been consumed the polyolefin will be protected from detrimental oxidation and the mechanical properties of the polyolefin will remain unchanged during this period. On the other hand, as soon as all the antioxidants/stabilisers, have been consumed the oxidation reactions will accelerate resulting in a relatively quick reduction in mechanical properties. The presence of antioxidants that are hydrolytically stable in the polyolefin composition is therefore an important feature of the present invention.

Hydrolytically Stable Antioxidants

The composition used in the present invention comprises a hydrolytically stable antioxidant. Preferred hydrolytically stable antioxidants have a half-life of at least 5 years, more preferably 10 years, still more preferably 15 years at pH 7 at 25° C. (EPIWIN HYDROWIN program v1.67). Still more preferably the hydrolytically stable antioxidant used in the present invention has a half-life of at least 1 year, more preferably 2 years, still more preferably 5 years at pH 8 at 25° C. (EPIWIN HYDROWIN program v1.67). There is no upper limit on the half-lives of the hydrolytically stable antioxidants. They might be, for example, 50 years at pH 7 and 40 years at pH 8.

Preferably the antioxidant used in the invention comprises a hydrolytically stable antioxidant of formula (I) or (II)

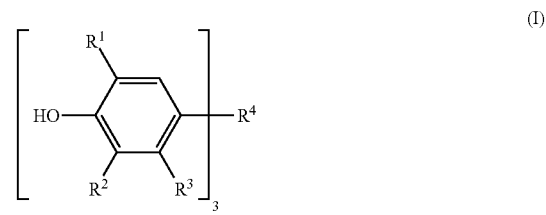

(I)

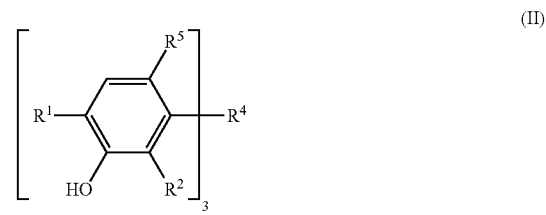

(II)

wherein
$R^1$ is $C_{1-18}$ alkyl, $C_{5-12}$ cycloalkyl, phenyl or $C_{7-9}$ phenylalkyl;
$R^2$ is hydrogen, $C_{1-18}$ alkyl, $C_{5-12}$ cycloalkyl, phenyl or $C_{7-9}$ phenylalkyl;
$R^3$ is hydrogen or methyl;
$R^4$ is (a), (b), (c) or (d)

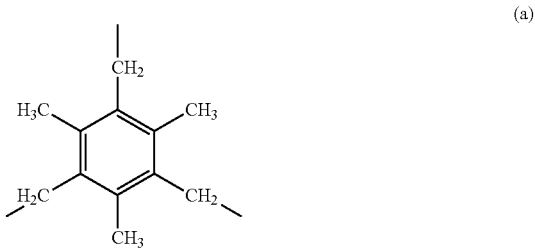

(a)

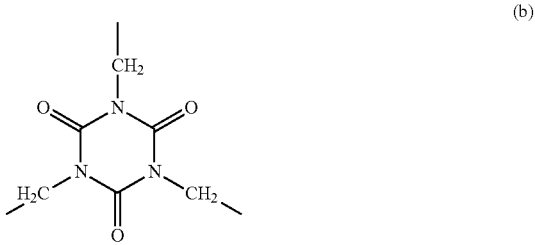

(b)

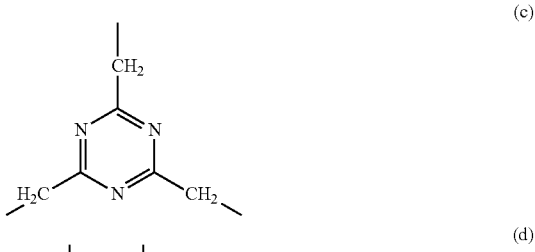

(c)

(d)

and $R^5$ is hydrogen or phenyl.

Preferred hydrolytically stable antioxidants are those wherein $R^1$ is tert-butyl, cyclohexyl or phenyl, especially tert-butyl.

Further hydrolytically stable antioxidants are those wherein $R^2$ is hydrogen, tert-butyl, cyclohexyl or phenyl, especially tert-butyl.

Further preferred hydrolytically stable antioxidants are those wherein $R^3$ is hydrogen.

Yet further preferred hydrolytically stable antioxidants are those wherein $R^4$ is group (a), (b) or (c), especially (a).

Particularly preferred hydrolytically stable preferred antioxidants are those of formula (I).

An especially preferred hydrolytically stable antioxidant is one of the following formula:

[Chemical structure of 1,3,5-tri-methyl-2,4,6-tris-(3,5-di-tert.butyl-4-hydroxyphenyl)benzene]

This hydrolytically stable antioxidant, 1,3,5-tri-methyl-2, 4,6-tris-(3,5-di-tert. butyl-4-hydroxyphenyl)benzene, is commercially available from BASF under the trade name Irganox 1330 or from Albemarle under the trade name Ethanox 330 (abbreviation IRGANOX 1330).

Synthetic Hydrotalcite

The composition used in the present invention preferably comprises hydrotalcite, particularly synthetic hydrotalcite (SHT). SHT is also sometimes referred to as an anionic clay or a layered double hydroxide. In SHT magnesium cations are octahedrally surrounded by six oxygens in the form of hydroxides; the octahedral units then, through edge sharing, form infinite sheets. The sheets are stacked on top of each other through hydrogen bonding. When some of the magnesium in the lattice is isomorphously replaced by a higher charged cation, e.g. $Al^{3+}$, then the resulting overall single $Mg^{2+}$-$Al^{3+}$-OH layers gain a positive charge. Counter anions in the form of carbonate are also often present. Usually SHT is in hydrated form.

A typical hydrotalcite may be represented by the formula $Mg_{1-x}Al_x(CO_3)_{x/2}(OH)_2 \cdot mH_2O$ wherein $0<x \leq 0.5$. Preferably the hydrotalcite is of the formula $Mg_{4.5}Al_2(CO_3)(OH)_{13} \cdot 3.5H_2O$.

Preferably the hydrotalcite has a density in the range 1 to 5 $g/cm^3$, more preferably 1.5 to 3 $g/cm^3$.

Preferably the hydrotalcite present in the composition of the present invention has an average particle size of 0.1 to 1 mm, more preferably 0.2 to 0.8 mm, still more preferably 0.30 to 0.60 mm. Preferably at least 75% vol of the particles are less than 1 mm in size, still more preferably at least 80% vol of the particles are less than 1 mm in size, yet more preferably at least 85% vol of the particles are less than 1 mm in size.

Particularly preferably the hydrotalcite present in the composition of the present invention is coated with a surfactant.

Preferably the hydrotalcite present in the composition of the present invention has a hardness of 1 to 5 Mohs, more preferably 1.5 to 3 Mohs.

Synthetic hydrotalcite for use in the present invention is commercially available from, for example, Kyowa Chemical Industry Co. as DHT-4A or DHT-4V.

Heat Stable Antioxidant

The composition used in the present invention preferably comprises a heat stable antioxidant. Preferred heat stable antioxidants are phenolic compounds of general formula (IIIa):

$$HO\text{—}(R^1R^2R^3R^4\text{-Phenyl})\text{-W} \qquad (IIIa)$$

wherein $R^1$ and $R^4$ are in the 2- and 6-position of the phenol residue, may be the same or different and are selected from the group consisting of $C_1$ to $C_{12}$ alkyl;

$R^2$ and $R^3$ are independently H or $C_{1-12}$ alkyl; and

W is selected from $C_1$ to $C_{12}$ alkyl, $C_1$ to $C_{12}$ alkoxy, $C_1$ to $C_{12}$ alkyl carboxylate or $C_1$ to $C_{12}$ alkyl substituted by a further group of the formula HO—$(R_1R_2R_3R_4$-Phenyl)-, wherein $R_1$ to $R_4$ are as hereinbefore defined.

In preferred compounds of formula (IIIa), $R^1$ and $R^4$ are the same. Particularly preferably $R^1$ and $R^4$ are branched alkyl. Particularly preferably $R^1$ and $R^4$ are selected from tert-butyl, iso-propyl, cyclohexyl, cyclopentyl and adamantyl.

Further preferred heat stable antioxidants are those of formulae (IIIb)

[Chemical structure (IIIb)]

wherein $R^1$ is $C_{1-18}$ alkyl, $C_{5-12}$ cycloalkyl, phenyl or $C_{7-9}$ phenylalkyl;

$R^2$ is hydrogen, $C_{1-18}$ alkyl, $C_{5-12}$ cycloalkyl, phenyl or $C_{7-9}$ phenylalkyl;

$R^3$ is hydrogen or methyl;

n is 0 or an integer from 1 to 6; and p is an integer from 2 to 6.

Preferred heat stable antioxidants of formula (IIIb) are those wherein $R^1$ is tert-butyl, cyclohexyl or phenyl, especially tert-butyl.

Further preferred heat stable antioxidants of formula (IIIb) are those wherein $R^2$ is hydrogen, tert-butyl, cyclohexyl or phenyl, especially tert-butyl.

Further preferred heat stable antioxidants of formula (IIIb) are those wherein $R^3$ is hydrogen.

Yet further preferred heat stable antioxidants of formula (IIIb) are those wherein n is 1, 2 or 3, especially 2.

Still further preferred heat stable antioxidants of formula (IIIb) are those wherein p is 4.

Representative examples of heat stable antioxidants that may be present in the compositions of the invention include:

2,6-Di-tert.-butyl-4-methyl phenol;

Pentaerythrityl-tetrakis(3-(3',5'-di-tert.-butyl-4-hydroxyphenyl)-propionate;

Octadecyl 3-(3',5'-di-tert.-butyl-4-hydroxyphenyl)propionate;
1,3,5-Trimethyl-2,4,6-tris-(3,5-di-tert.-butyl-4-hydroxyphenyl)benzene;
2,2'-Thiodiethylene-bis-(3,5-di-tert.-butyl-4-hydroxyphenyl)-propionate;
Calcium-(3,5-di-tert.-butyl-4-hydroxy benzyl monoethylphosphonate);
1,3,5-Tris(3',5'-di-tert.-butyl-4'-hydroxybenzyl)-isocyanurate;
Bis-(3,3-bis-(4'-hydroxy-3'-tert.-butylphenyl)butanoic acid)-glycolester;
4,4'-Thiobis(2-tert.-butyl-5-methylphenol);
2,2'-Methylene-bis(6-(1-methyl-cyclohexyl)para-cresol);
N,N'-hexamethylene bis(3,5-di-tert. Butyl-4-hydroxy-hydrocinnamamide;
2,5,7,8-Tetramethyl-2(4',8',12'-trimethyltridecyl)chroman-6-ol;
2,2'-Ethylidenebis(4,6-di-tert.-butylphenol);
1,1,3-Tris(2-methyl-4-hydrosy-5-tert.-butylphenyl)butane;
1,3,5-Tris(4-tert.-butyl-3-hydroxy-2,6-dimethylbenzyl)-1,3,5-triazine-2,4,6-(1H,3H,5H)-trione;
3,9-Bis(1,1-dimethyl-2-(beta-(3-tert.-butyl-4-hydroxy-5-methylphenyl)propionyloxy) ethyl)-2,4,8,10-tetraoxaspiro(5,5)undecane;
1,6-Hexanediyl-bis(3,5-bis(1,1-dimethylethyl)-4-hydroxybenzene-propanoate);
2,6-Di-tert.-butyl-4-nonylphenol;
3,5-Di-tert.-butyl-4-hydroxyhydrocinnamic acid triester with 1,3,5-tris (2-hydroxyethyl)-s-triazine-2,4,6(1H, 3H,5H)-trione;
4,4'-Butylidenebis(6-tert. Butyl-3-methylphenol);
2,2'-Methylene bis(4-methyl-6-tert.-butylphenol);
2,2-Bis(4-(2-(3,5-di-t-butyl-4-hydroxyhydrocinnamoyloxy))ethoxy-phenyl))propane;
Triethyleneglycole-bis-(3-tert.-butyl-4-hydroxy-5 methylphenyl) propionate;
Benzenepropanoic acid, 3,5-bis(1,1-dimethylethyl)-4-hydroxy-,$C_{13}$-$C_{15}$-branched and linear alkyl esters;
6,6'-Di-tert.-butyl-2,2'-thiodi-p-cresol;
Diethyl((3,5-bis(1,1-dimethylethyl)-4-hydroxyphenyl) methyl) phosphonate;
4,6-Bis(octylthiomethyl)o-cresol;
Benzenepropanoic acid, 3,5-bis(1,1-dimethylethyl)-4-hydroxy-, $C_7$-$C_9$-branched and linear alkyl esters;
1,1,3-Tris[2-methyl-4-[3-(3,5-di-t-butyl-4-hydroxyphenyl)-propionyloxy]-5-t-butylphenyl]butane; and
a butylated reaction product of p-cresol and dicyclopentadiene.
Preferred heat stable antioxidants are:
Pentaerythrityl-tetrakis(3-(3',5'-di-tert.-butyl-4-hydroxyphenyl)-propionate;
Octadecyl 3-(3',5'-di-tert.-butyl-4-hydroxyphenyl)propionate;
1,3,5-Trimethyl-2,4,6-tris-(3,5-di-tert.-butyl-4-hydroxyphenyl)benzene;
1,3,5-Tris(3',5'-di-tert.-butyl-4'-hydroxybenzyl)-isocyanurate;
Bis-(3,3-bis-(4'-hydroxy-3'-tert.-butylphenyl)butanoic acid)-glycolester; and
3,9-Bis(1,1-dimethyl-2-(beta-(3-tert.-butyl-4-hydroxy-5-methylphenyl)-propionyloxy) ethyl)-2,4,8,10-tetraoxaspiro(5,5)undecane;

An especially preferred heat stable antioxidant is one of the following formula:

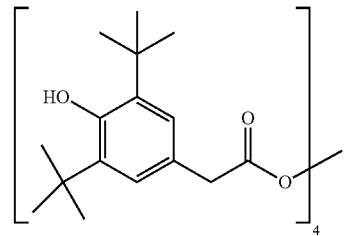

This heat stable antioxidant is commercially available from BASF under the trade name Irganox 1010 (abbreviation IRGANOX 1010).

Organic Phosphate or Phosphonite Antioxidant

The composition used in the present invention preferably comprises an organic phosphite or phosphonite antioxidant. Preferred organic phosphite or phosphonite antioxidants are those of formulae (IVa) bis($R^1$)-pentaerythritoldiphosphite (IVa), wherein $R^1$ is selected from $C_1$-$C_{25}$ alkyl group or $C_{6-10}$ aryl group optionally substituted by $C_{1-6}$ alkyl.

Further preferred organic phosphite or phosphonite antioxidants are those of formulae (IVb)

wherein
Y is a direct bond or —O—; and
$R^1$, $R^2$ and $R^3$ are independently selected from substituted or unsubstituted alkyl having 1-30 carbons, substituted or unsubstituted cycloalkyl having 5 to 12 carbons, substituted or unsubstituted aryl having 6 to 10 carbons or a group of the formula (V)

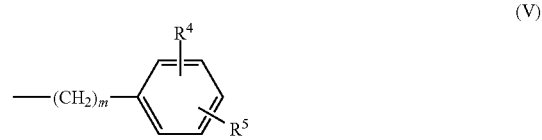

wherein
m is an integer in the range 1 to 3; and
$R^4$ and $R^5$ are independently $C_{1-18}$ alkyl or $C_{5-12}$ cycloalkyl.

The substituents optionally present on $R^1$, $R^2$ and $R^3$ groups are preferably selected from halogen, $C_{1-6}$ alkyl, $C_{1-6}$ alkoxy or $COOC_{1-6}$. Particularly preferably the substituents are $C_{1-6}$ alkyl, e.g. tert-butyl.

Preferred groups of formula (V) are those wherein $R^4$ and $R^5$ are $C_{1-18}$ alkyl, more preferably $C_{1-6}$ alkyl, e.g. $C_4$ alkyl. Preferably $R^4$ and $R^5$ are tert-butyl.

Preferred organic phosphite or phosphonite antioxidants are those of formulae (IVb) wherein Y is —O—.

Further preferred organic phosphite or phosphonite antioxidants are those of formulae (IVb) wherein $R^2$ and $R^3$ are substituted or unsubstituted aryl, particularly substituted aryl, e.g. phenyl. Preferred substituent groups are $C_{1-6}$ alkyl, e.g. tert-butyl.

Further preferred organic phosphite or phosphonite antioxidants are those of formulae (IVb) wherein $R^1$ is substituted or unsubstituted aryl, particularly substituted aryl, e.g. phenyl. Preferred substituent groups are $C_{1-6}$ alkyl, e.g. tert-butyl.

Representative examples of organic phosphite or phosphonite antioxidants that may be present in the compositions of the present invention include:

Tris(2,4-di-t-butylphenyl) phosphite;
Tetrakis-(2,4-di-t-butylphenyl)-4,4'-biphenylen-di-phosphonite
Bis(2,4-di-t-butylphenyl)-pentaerythrityl-di-phosphite;
Di-stearyl-pentaerythrityl-di-phosphite;
Tris-nonylphenyl phosphite;
Bis(2,6-di-t-butyl-4-methylphenyl)pentaerythrityl-di-phosphite;
2,2'-Methylenebis(4,6-di-t-butylphenyl) octyl-phosphite;
1,1,3-Tris(2-methyl-4-ditridecyl phosphite-5-t-butylphenyl) butane;
4,4'-Butylidenebis(3-methyl-6-t-butylphenyl-di-tridecyl) phosphite;
Bis(2,4-dicumylphenyl)pentaerythritol diphosphite;
Bis(2-methyl-4,6-bis(1,1-dimethylethyl)phenyl)phosphorous acid ethylester;
2,2',2"-Nitrilo triethyl-tris(3,3',5,5'-tetra-t-butyl-1,1'-biphenyl-2,2'-diyl)phosphite);
Phosphorous acid, cyclic butylethyl propandiol, 2,4,6-tri-t-butylphenyl ester;
Bis(2,4,6-tri-t-butylphenyl)-pentaerythrityl-di-phosphite;
2,2'-Ethylidenebis(4,6-di-t-butylphenyl) fluorophosphonite
6-(3-tert-Butyl-4-hydroxy-5-methylphenyl)propoxy)-2,4,8,10-tetra-tert.-butyldibenz(d,t)(1.3.2)dioxaphosphepin; and
Tetrakis-(2,4-di-t-butyl-5-methyl-phenyl)-4,4'-biphenylen-di-phosphonite Preferred organic phosphite or phosphonite antioxidants are:

Tetrakis-(2,4-di-t-butylphenyl)-4,4'-biphenylen-di-phosphonite;
Bis(2,6-di-t-butyl-4-methylphenyl)pentaerythrityl-di-phosphite;
Di-stearyl-pentaerythrityl-di-phosphite; and
Bis(2,4-dicumylphenyl)pentaerythritol diphosphite.

An especially preferred organic phosphite or phosphonite antioxidant is one of the following formula:

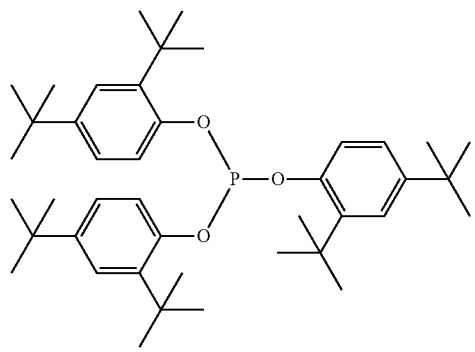 [SMILES: CC(C)(C)c1ccc(OP(Oc2ccc(C(C)(C)C)cc2C(C)(C)C)Oc2ccc(C(C)(C)C)cc2C(C)(C)C)c(C(C)(C)C)c1]

This antioxidant is commercially available from BASF under the trade name Irgafos 168 (abbreviation AO168).

Sulphoeter Antioxidant

The composition used in the present invention preferably comprises a sulphoether antioxidant. It is believed that these antioxidants act to decompose hydroperoxides. Preferred sulphoether antioxidants are those derived from lauric or stearic acid.

Preferred sulphoether antioxidants are di($C_1$-$C_{20}$)alkyl-S-di-carboxylates wherein the carboxylic acid is selected from $C_1$ to $C_{10}$ alkyl carboxylic acids.

Representative examples of sulphoether antioxidants that may be used in the compositions of the present invention include:

Di-stearyl-thio-di-propionate;
Di-palmityl/stearyl-thio-di-propionate;
Di-lauryl-thio-di-propionate;
Di-tridecyl-thio-di-propionate;
Di-myristyl-thio-di-propionate;
Pentaerythritol octyl thiodipropionate;
Lauryl-stearyl-thio-di-propionate;
Di-octadecyl-disulphide;
Di-tert-dodecyl-disulphide; and
Pentaerythritol-tetrakis-(3-laurylthiopropionate).

Pentaerythritol tetrakis(B-laurylthiopropionate) (CAS 29598-76-3)), distearyl-3,3'-thiodipropionate (CAS 693-36-7) and dilauryl-3,3'-thiodipropionate (CAS 123-28-4) are preferred. A particularly preferred sulfoether antioxidant is distearyl-3,3'-thiodipropionate (DSTDP). It is commercially available under the trade name Irganox PS 802-FL from BASF.

Hindered Amine Antioxidant

The composition used in the present invention preferably also comprises a sterically hindered amine antioxidant. Preferred sterically hindered amine antioxidants have a molecular weight of greater than 500 g/mol.

Particularly preferred amine antioxidants for use in the compositions of the present invention comprise a radical of formulae (VI)

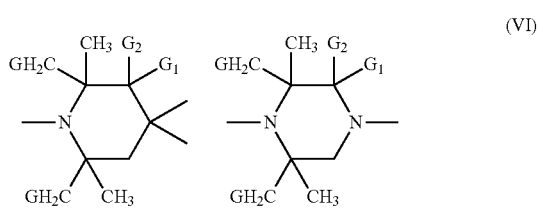

wherein
G is hydrogen or methyl;
$G_1$ and $G_2$ are hydrogen, methyl or together are =O.

An especially preferred amine antioxidant is one of the following formula:

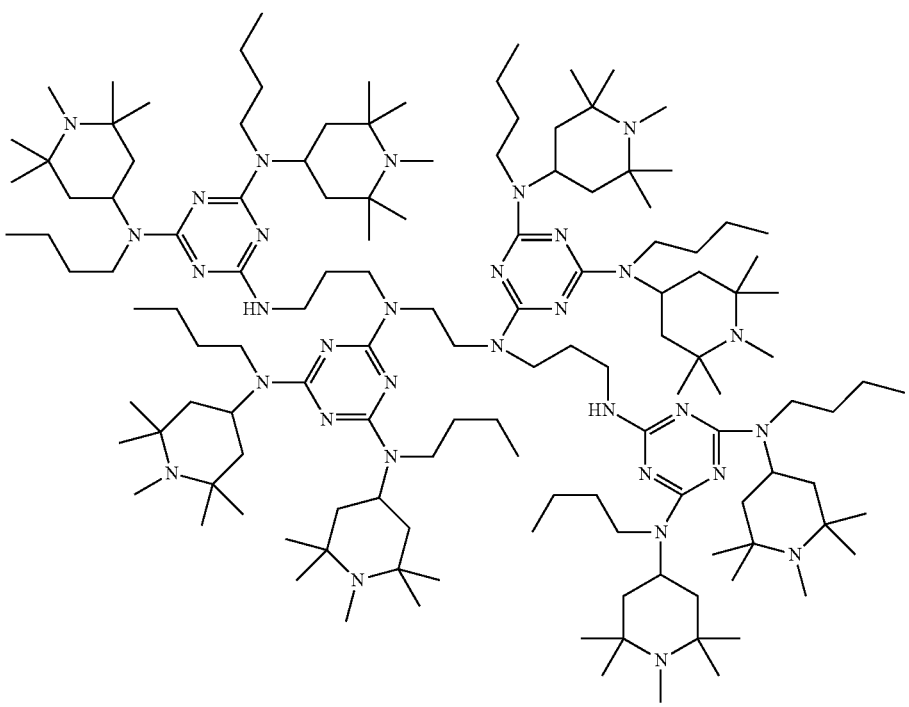 [SMILES: CCCCN(c1nc(NCCCN(CCN(CCCNc2nc(N(CCCC)C3CC(C)(C)N(C)C(C)(C)C3)nc(N(CCCC)C3CC(C)(C)N(C)C(C)(C)C3)n2)c2nc(N(CCCC)C3CC(C)(C)N(C)C(C)(C)C3)nc(N(CCCC)C3CC(C)(C)N(C)C(C)(C)C3)n2)c2nc(N(CCCC)C3CC(C)(C)N(C)C(C)(C)C3)nc(N(CCCC)C3CC(C)(C)N(C)C(C)(C)C3)n2)nc(N(CCCC)C2CC(C)(C)N(C)C(C)(C)C2)n1)C1CC(C)(C)N(C)C(C)(C)C1]

This antioxidant is commercially available from BASF under the trade name Chimassorb 119.

Other Additives

The composition used in the present invention optionally comprises other conventional additives. Representative examples of suitable additives include nucleating agents (a or b, preferably b, nucleating agents), light stabilisers, colourants, antistatic agents, lubricants, carbon black and flame retardants. A filler (e.g. talc) may also be present.

Preparation of Composition

The polyolefin is mixed with antioxidants and optionally SHT, as well as any additional additives present in the composition, by conventional techniques, e.g. by blending. The preferred composition may either be prepared directly by the polymer producer, i.e. by 1) adding the total additive formulation to a polymer powder followed by extrusion compounding and pelletization, or 2) by adding the missing additives to a commercial polymer (P1) preferably via a masterbatch (MB) of the missing additives in same type of polymer as P1, or preferably addition of the additives direct into P1. For both 1) and 2) the total blends are extrusion compounded to give an optimum distribution of the additives in the polymer.

Preferred compositions for use in the present invention comprise a polyolefin, a hydrolytically stable antioxidant and SHT. Other preferred compositions for use in the invention comprise a polyolefin, a hydrolytically stable antioxidant and a heat stable antioxidant. Particularly preferred compositions comprise a polyolefin, a hydrolytically stable antioxidant, a heat stable antioxidant and SHT. Compositions as hereinbefore listed additionally comprising an organic phosphite or phosphonite antioxidant and/or a thioether antioxidant are especially preferred.

A preferred composition for use in the present invention comprises:

(i) a polyolefin, preferably a propylene polymer;
(ii) a hydrolytically stable antioxidant, preferably a compound of formulae I or II, e.g. Irganox 1330;
(iii) synthetic hydrotalcite;
(iv) a heat stable antioxidant, preferably a compound of formula III, e.g. Irganox 1010;
(v) an organic phosphite or phosphonite antioxidant, preferably a compound of formula IV, e.g. Irgafos 168; and
(vi) a thioether antioxidant, preferably distearyl-3,3'-thiodipropionate.

The amount of polyolefin, preferably a propylene polymer, present in the composition is preferably 55-99.8 wt %, still more preferably 90-99.5 wt %, e.g. 98-99.5 wt %.

The amount hydrolytically stable antioxidant, preferably a compound of formulae I or II, present in the composition is preferably 100-10,000 wt ppm, still more preferably 2000-8000 wt ppm, e.g. 3000-6000 wt ppm.

The amount of synthetic hydrotalcite present in the composition is preferably 100-10000 wt ppm, still more preferably 250-5000 wt ppm, e.g. 1000-3000 wt ppm.

The amount of heat stable antioxidant, preferably a compound of formula III, present in the composition is preferably 100-10000 wt ppm, still more preferably 500-6000 wt ppm, e.g. 1000-4000 wt ppm.

The amount of organic phosphite or phosphonite antioxidant, preferably a compound of formula IV, present in the composition is preferably 100-5000 wt ppm, still more preferably 300-3000 wt ppm, e.g. 500-2000 wt ppm.

The amount of thioether antioxidant, preferably distearyl-3,3'-thiodipropionate, present in the composition is preferably 500-10000 wt ppm, still more preferably 1000-8000 wt ppm, e.g. 2000-6000 wt ppm.

The total amount of all of the antioxidants present in the compositions is preferably 400-35000 wt ppm, still more preferably 2000-25000 wt ppm, e.g. 4000-18000 wt ppm.

Properties of Composition

The preferred properties of the composition, as determined according to the methods set out in the examples section relating to single plates, are as follows:

The amount of hydrolytically stable antioxidant present in a composition after exposure to a new 30% aqueous solution of an amine, e.g. MEA at 80° C. for 12 weeks is at least 75%, preferably at least 80%, more preferably at least 85% of the amount originally present. Still more preferably the amount of hydrolytically stable antioxidant present in a composition after exposure to a new 30% aqueous solution of an amine, e.g. MEA at 95° C. for 12 weeks is at least 70%, preferably at least 75%, more preferably at least 80% of the amount originally present.

The swell weight of a composition after exposure to a new 30% aqueous solution of an amine, e.g. MEA at 80° C. for 12 weeks is preferably less than 1%, still more preferably less than 0.5%, yet more preferably less than 0.3%. Still more preferably the swell weight of a composition after exposure to a new 30% aqueous solution of an amine, e.g. MEA at 95° C. for 12 weeks is preferably less than 2%, still more preferably less than 1%, yet more preferably less than 0.75%.

The tensile modulus of a composition after exposure to a new 30% aqueous solution of an amine, e.g. MEA at 80° C. for 12 weeks is at least 80%, preferably at least 85%, more preferably at least 90% of the tensile modulus of the unaged composition. Still more preferably the tensile modulus of a composition after exposure to a new 30% aqueous solution of an amine, e.g. MEA at 95° C. for 12 weeks is at least 75%, preferably at least 80%, more preferably at least 85% of the tensile modulus of the unaged composition.

The stress at yield of a composition after exposure to a new 30% aqueous solution of an amine, e.g. MEA at 80° C. for 12 weeks is at least 85%, preferably at least 90%, more preferably at least 95% of the stress at yield of the unaged composition. Still more preferably the stress at yield of a composition after exposure to a new 30% aqueous solution of an amine, e.g. MEA at 95° C. for 12 weeks is at least 80%, preferably at least 85%, more preferably at least 90% of stress at yield of the unaged composition.

The strain at yield of a composition after exposure to a new 30% aqueous solution of an amine, e.g. MEA at 80° C. for 12 weeks is less than 150%, preferably less than 145%, more preferably less than 140% of the strain at yield of the unaged composition. Still more preferably the strain at yield of a composition after exposure to a new 30% aqueous solution of an amine, e.g. MEA at 95° C. for 12 weeks is less than 155%, preferably less than 150%, more preferably less than 145% of strain at yield of the unaged composition.

The stress at break of a composition after exposure to a new 30% aqueous solution of an amine, e.g. MEA at 80° C. for 12 weeks is at least 80%, preferably at least 85%, more preferably at least 90% of the stress at break of the unaged composition. Still more preferably the stress at break of a composition after exposure to a new 30% aqueous solution of an amine, e.g. MEA at 95° C. for 12 weeks is at least 80%, preferably at least 85%, more preferably at least 90% of stress at break of the unaged composition.

The strain at break of a composition after exposure to a new 30% aqueous solution of an amine, e.g. MEA at 80° C. for 12 weeks is at least 70%, preferably at least 75%, more preferably at least 80% of the strain at break of the unaged composition. Still more preferably the strain at break of a composition after exposure to a new 30% aqueous solution of an amine, e.g. MEA at 95° C. for 12 weeks is at least 65%, preferably at least 70%, more preferably at least 75% of strain at break of the unaged composition.

Application

The present invention relates to a column for capture of acidic gases such as $CO_2$. As described above this process typically involves introducing an exhaust gas containing, for example, $CO_2$ into the bottom of an absorption column wherein the gas flows upwards and countercurrent to a lean (low content of $CO_2$) absorbent in one or more contact sections of the column. The contact sections may optionally comprise a structural or random packing to increase the contact area between the absorbent and the gas. After leaving the contact sections the gas is usually washed and then withdrawn through a line at the top of the column.

The rich (higher content of $CO_2$) absorbent, usually an amine, is typically collected (e.g. on collector trays) and withdrawn by a line at the bottom of the column. It is fed to a regeneration or desorber column wherein it flows downwards and countercurrent to a flow of $CO_2$ and water vapour. Preferably the flow of $CO_2$ and water vapour is generated by heating a fraction of lean absorbent from the bottom of the desorber through a steam heated reboiler. From the bottom of the desorber lean absorbent can be returned to the absorption column. There is preferably a washing section in the upper part of the desorber and $CO_2$ and water vapour are withdrawn from the top of the desorber column through a line and cooled in a desorber condenser.

Both the absorption column and the regeneration (desorber) column are therefore exposed to amine absorbents at high temperatures and for long periods of time and thus suffer the problems of material degradation and failure described above. The column of the present invention may therefore be an absorption column or a regenerator column. Most preferably, however, the column is an absorption column.

The entirety of the inner surface of a column may comprise the polyolefin composition hereinbefore described. Alternatively only a part of the inner surface may comprise the polyolefin composition, e.g. it may be that only the inner surface of the section of the column wherein contact with absorbent occurs (referred to as the contact section) comprises the polyolefin composition. The surfaces of other parts present in the interior of the column, e.g. collection plates, trays, piping may also be coated or lined with the polyolefin composition herein described.

The column may be constructed of the polyolefin composition hereinbefore described. More preferably, however, the column is constructed of concrete, metal or composite material. In this case, the inner surface is formed by coating the interior of said column with said polyolefin composition. Alternatively, and preferably, the inner surface may be formed by fixing a liner comprising the polyolefin composition to the interior of said column.

In some liners the anchors for attaching the liner to the walls of the column also comprise said polyolefin composition. Alternatively the anchors may comprise a different composition.

The liners of the present invention may be in any form conventional in the art. For example, the liners may be in the form of sheets, profiles or tubes, preferably sheets and profiles. The thickness of the liner is preferably in the range 0.5-50 mm, more preferably 2-20 mm, e.g. 4-12 mm.

The present invention also relates to other apparatus and parts used in the acidic gas capture process that are exposed to similar operating conditions as described above. This includes, for example, inserts used in the column (e.g. column packing material, trays, etc) and piping.

The liners, columns, inserts, piping and apparatus of the present invention may be used in any method of capturing an acidic gas, e.g. $CO_2$. Most preferably, however, they are used in methods wherein amine, particularly an aqueous solution of one or more amines, is used as absorbent.

Preferred absorbents for use are, for example, aliphatic or cycloaliphatic amines having from 4 to 12 carbons, alkanolamines having from 4 to 12 carbons, cyclic amines where 1 or 2 nitrogens together with 1 or 2 alkylene groups form 5-, 6- or 7-membered rings, mixtures of the above and aqueous solutions of the above amines and mixtures. Representative examples of amines that may be used include monoethanolamine (MEA), diethanolamine (DEA), triethanolamine (TEA), diethylethanolamine (DEEA), diisopropylamine (DIPA), aminoethoxyethanol (AEE), methyldiethanolamine (MDEA), piperazine (PZ), 2-amino-2-methyl-1-propanol (AMP) and mixtures of the above and aqueous solutions of the above.

Figure 2:
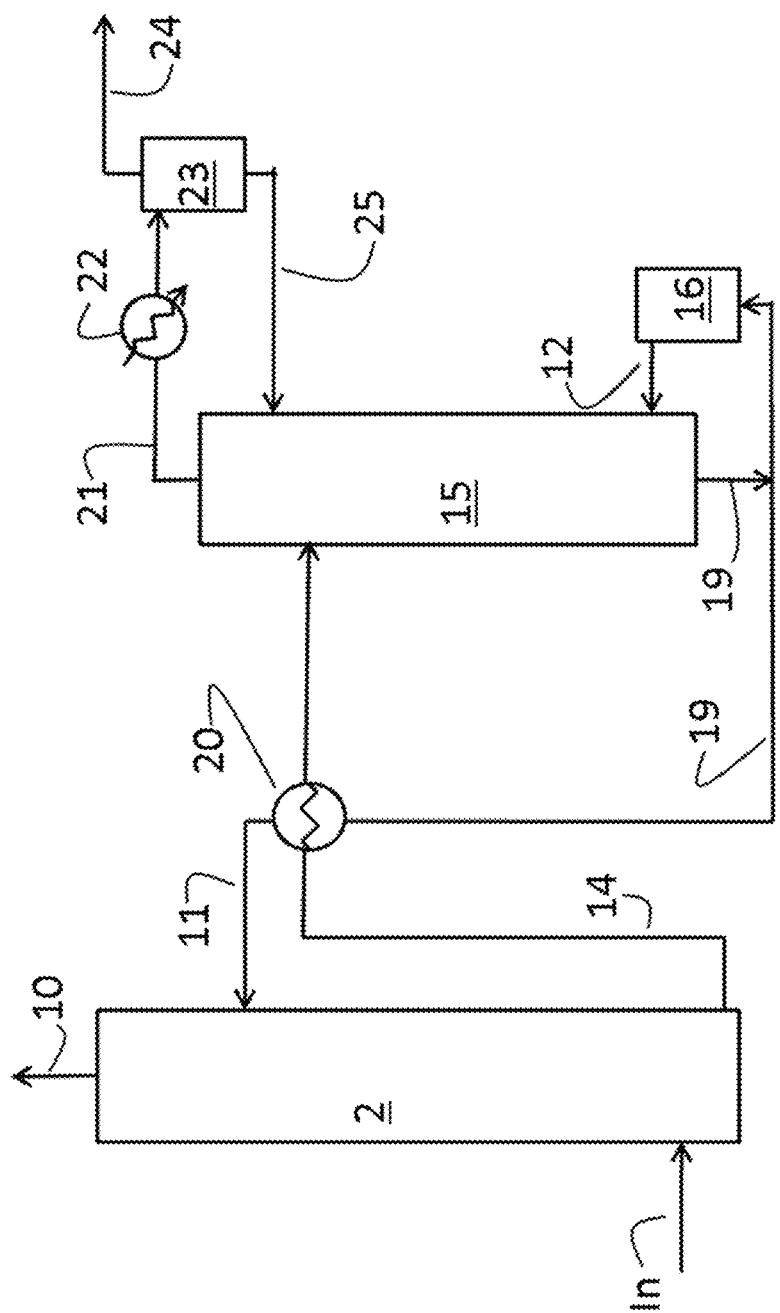
FIG. 2 is a schematic diagram of a capture process

The structure of the columns, liners and apparatus of the present invention is conventional and as described in the prior art. FIG. 1 illustrates a typical absorption column. FIG. 2 illustrates a typical apparatus comprising an absorption column and a regeneration column.

Referring to FIG. 1, combustion gas, generally cooled, is introduced in an inlet chamber 1 at the bottom of the absorption column 2. From the inlet chamber 1, the gas flows upwards in the absorption column and countercurrent to liquid absorbent, e.g. amine solution, in one or more contact sections, 3, 4. The illustrated absorption column is provided with two serially connected contact sections 3, 4 but any number of such sections may be included. After leaving the contact sections 3, 4 the gas is washed by a countercurrent flow of water in a washing section 5 to remove any amine in the gas flow. Washing water is introduced via line 6 and sprayed at the top of the washing section 5. The water is collected at plate 7 below the washing section and removed via line 8. Water droplets in the washed gas flow are preferably removed in demister section 9 before $CO_2$ depleted exhaust gas is withdrawn through line 10. The column 2 may comprise several water sections or other types of polishing/washing sections in the upper part. Typically 80-99% of the original $CO_2$ present in the gas is removed by absorption.

Absorbent is introduced into the column via line 11 and is sprayed on top of the upper contact section 4 by means of liquid distribution means. The absorbent flows through the upper contact section 4 and is collected at an absorbent plate 12. The absorbent is withdrawn via line 13 and sprayed at the top of the lower contact section 3. After flowing through the lower contact section 3 the absorbent and the $CO_2$ absorbed thereto is collected from the bottom of the column and withdrawn via line 14.

The temperature of the absorbent in the absorption step is generally from about 30 to 100° C., when one column is used, for example from 30 to 70° C. at the top of the column and from 30 to 100° C. at the bottom of the column. The overall pressure in the absorption step is generally from about 0.5 to 20 bara, preferably from about 0.7 to 12 bara, particularly preferably from 0.7 to 6 bara.

Referring to FIG. 2 in regeneration column 15 the $CO_2$ rich absorbent flows downwards, countercurrent to a flow of released $CO_2$ and water vapour, optionally generated by heating some of the absorbent in a regeneration reboiler 16. Lean absorbent leaves the regeneration column through an outlet 17. A part of this lean absorbent is introduced into the regeneration boiler 16 where it is heated to produce hot absorbent and steam which is reintroduced into the regeneration column through line 18. The heating of the column from the bottom gives a temperature gradient at steady state from the bottom to the top of the column, where the temperature at the top is from about 10 to 50° C. lower than at the bottom, depending on the actual design of the column. In a typical regeneration column the temperature at the bottom of the column is about 120° C. and the temperature at the top is about 10 to 50° C. lower.

The lean absorbent that is not introduced into the regeneration boiler is recycled back to the absorption column 2 through line 19 and cooled in heat exchanger 20 against rich absorbent in the line 14. In the heat exchanger 20 the relatively cold $CO_2$ rich absorbent is heated against the relatively hot lean absorbent leaving the desorber at a temperature of about 120° C.

$CO_2$ released from the absorbent and water vapour is withdrawn from the regenerator column through line 21. The gas in the line is cooled in a reflux condenser 22 to condense water that is separated from the remaining gas, mainly comprising $CO_2$ in a $CO_2$ separator 23. The $CO_2$, withdrawn in line 24, may be further treated, e.g. drying, compression and/or deposition. The condensed water in the $CO_2$ separator is withdrawn through line 25 and pumped back to the top of the regeneration column.

The columns and liners of the present invention may also be used in the methods described in WO2008/108657, WO2008/063079, WO2008/130244, US 2010/0029466, WO2009/035340, WO2009/108064, WO2010/102877 and WO/2010/142716, the entire contents of which are incorporated by reference.

EXAMPLES

The invention will now be described with reference to the following non-limiting examples.

Analytic Tests

Values quoted in the description and examples are measured according to the following tests:

The melt flow rate (MFR) is determined according to ISO 1133 and is indicated in g/10 min. The MFR is an indication of the melt viscosity of the polymer. The MFR is determined at 230° C. for PP and at 190° C. PE. The load under which the melt flow rate is determined is usually indicated as a subscript, for instance $MFR_2$ is measured under 2.16 kg load and $MFR_5$ is measured under 5 kg load.

Density was measured according to ISO 1183.

The weight average molecular weight Mw and the molecular weight distribution (MWD=Mw/Mn wherein Mn is the number average molecular weight and Mw is the weight average molecular weight) is measured by a method based on ISO 16014-4:2003. A Waters 150CV plus instrument, equipped with refractive index detector and online viscosimeter was used with 3×HT6E styragel columns from Waters (styrene-divinylbenzene) and 1,2,4-trichlorobenzene (TCB, stabilized with 250 mg/L 2,6-Di tert butyl-4-methyl-phenol) as solvent at 140° C. and at a constant flow rate of 1 mL/min. 500 mL of sample solution were injected per analysis. The column set was calibrated using universal calibration (according to ISO 16014-2:2003) with 10 narrow MWD polystyrene (PS) standards in the range of 1.05 kg/mol to 11 600 kg/mol. Mark Houwink constants were used for polystyrene and polyethylene (K: 19×10<−3> dL/g and a: 0.655 for PS, and K: 19×10<−3> dL/g and a: 0.725 for PP). All samples were prepared by dissolving 0.5-3.5 mg of polymer in 4 mL (at 140° C.) of stabilized TCB (same as mobile phase) and keeping for 2 hours at 140° C. and for another 2 hours at 160° C. with occasional shaking prior sampling in into the GPC instrument.

Comonomer content can be determined in a known manner based on Fourier transform infrared spectroscopy (FTIR) determination calibrated with $^{13}$C-NMR.

Melting temperature (Tm), crystallization temperature (Tc) and degree of crystallinity (Xc) were measured according to ISO11357. The samples were cut from compression molded, 0.2 mm films. The measurements were performed at the following conditions:

TABLE 1

| Stage | Temperature Program | Heating/Cooling rate °C./min | Time Minutes |
|---|---|---|---|
| $1^{st}$ heating | 20-225° C. | 10 | |
| Isothermal | 225° C. | | 5 |
| Cooling | 225-20° C. | −10 | |
| Isothermal | 20° C. | | 1 |
| $2^{nd}$ heating | 20-225° C. | 10 | |

The Tm and Xc were determined from the second heating. The degree of crystallinity (Xc) was calculated using a melting enthalpy of 100% PP equal to 209 J/g.

The content of beta is measured by wide angle x-ray diffraction (WAXD). A WAXD scan of a PP sample contains diffraction peaks of both the alpha crystalline phase (3 peaks due to the (110), (130) and (040) planes) and the beta crystalline phase (1 peak due to the (300) plane. An empirical ratio of the intensity (I) of these peaks known as the K-value and defined as followed is used to define the beta content:

$$K=I(300)_\beta/I(300)_\beta+I(110)_\alpha+I(130)_\alpha+I(040)_\alpha$$

Tensile modulus was measured according to ISO 527. Tensile strain at yield and tensile stress at yield were measured according to ISO 527-2.

Heat deflection temperature was measured according to ISO-75-2.

Vicat softening temperature B50 (50N) was measured according to ISO 306.

Charpy impact strength, notched (23 and −20° C.) was measured according to ISO 179/1eA.

Accelerated Aging of PP-H-100 and BE60-7032 with Additional Antioxidants

1a. Commercially available sheets of PP-H-100 without anchor and having a size of approx 20×30 cm, thickness 8 mm were used.

1b. For the preparation of BE60-7032 with extra antioxidants, a MB with the composition; 94% BE60-7032+5% Irganox 1330+1% SHT, was compounded. 10% of this MB was then added to BE60-7032 for compounding of the preferred composition. Pellets with the preferred composition was then compression moulded to plaques with the dimension: 70 mm×40 mm×8 mm 2. The samples for testing were prepared by a using a band saw/circular saw as follows.

a. For tensile testing the samples were milled to standard dog bone (multipurpose type 1B).

b. For differential scanning calorimetry (DSC) measurement; samples sliced by microtome from surface of non-exposed and exposed sheets (70×10×8 mm), 0-100 µm, 1-2 mg sample weight.

c. For measurement of the amount of anti-oxidant (AO) present; sheet of size: 60×60×8 mm or 70×40×8 mm.

3. All samples were labelled with a number to ensure traceability especially for calculation of swelling.

4. All test pieces were immersed in 2 liter glass containers. The samples were tied to a rack made of acid-proof stainless steel. This was done to ensure good distance between the samples.

5. The containers were filled with a 30% MEA aqueous solution and were regulated to a temperature of 95° C., 80° C. or 60° C.

6. The maximum number of samples placed in each chamber was: 8 standard dog bones, 6 test pieces size 60×60×8 mm or 70×40×8 mm and 6 test pieces size 70×10×8 mm.

7. No stirring was done. When testing commercially available PP-H-100 samples containing IRGANOX 1010, AO168 and DSTDP, the 30% aqueous MEA solution for the 95° C. container was changed each week and for the 80° C. container 50% of the 30% MEA aqueous solution was replaced each week. When testing samples of BE60-7032 containing IRGANOX 1010, IRGANOX 1330, SHT and DSTDP either new 30% MEA or used (as described above) aqueous solution was used. Used amine is amine that has been used for $CO_2$ capture for a considerable period of time in a test plant, and which contains realistic amounts of amine degradation products and contaminations. For the used amine no change in solutions during the test period was done, only refill to ensure all samples were covered by liquid during the whole test period.

8. Samples for DSC and AO measurements were taken out after 1, 2, 3, 5, 8, 12 and/or 20 weeks. For tensile testing samples were measured before ageing and after 8, 12 and 20 weeks.

9. DSC was performed on material taken from the surface of the sheet. A 100 µm thick layer was sliced off, followed by a further slice of 100 µm. Both test pieces were analyzed by DSC to evaluate changes in beta crystals.

10. AO measurement. Plates of size 6×6 cm, thickness 8 mm were taken from the containers then cut/ground into powder with a size of 1 mm. The powder was mixed to a homogeneous mixture, then extracted in suitable solvents. The solutions were filtered to remove the powder. The solutions were then injected into an HPLC (High Performance Liquid Chromatography) machine. To ensure the quality of the results a known standard is always used together with the samples. In addition the extractions technique is performed by using an internal standard.

11. The AO measurements were been used to calculate lifetime for the sheet as follows:

From the HPLC results depletion curves as a function of storage time at the different storage conditions have been made of the different AOs. The reduction of AO as a function of time appears to be logarithmic, thus from the ln (AO concs) versus time relationship, the time until [AO]=1 ppm has been calculated at the different conditions. By putting these results into an Arrhenius plot the time until AO concentration=1 ppm is predicted at any temperature.

Test Methods

1. Determination of the Amount of AO Present in Unaged and Aged Samples
    Method Liquid Chromatography
    Instrument Agilent 1100
    Specimen type Single plate unless otherwise specified
    Chromatographic conditions:
    Column: C-18
    Mobile phase: Water/AcN/IPA-gradient
    Detector: UV, 276 nm 2. Absorption Test Swell—According to DS/EN ISO 16101: 2004 B.2.1 Resistance to Absorption Swelling
    Immersion liquid Monoethanolamine, MEA, 30% aqueous solution
    Receptacle Heat chamber
    Specimen type Sheet of 0.8×4×7 cm thickness
    Test conditions The samples are fully immersed in the liquid at the different temperatures shown. The samples are removed from liquid, stored in a climate chamber at 23° C. and weighed. Mass is weighing after specified intervals
    Definitions % mass increase
    Method uncertainty: 10% standard deviation 3. Tensile Testing—According to ISO 527-2
   Instrument Zwick Z010 with Macro extensometer
   Specimen type Multipurpose type 1B, milled from the delivered plates with thickness 5 mm and 8 mm. Width of the specimens are 10 mm.
   Test conditions Testing speed 50 mm/min.
   Tensile modulus 1 mm/min
   Tensile modulus, MPa—(the modulus of elasticity in tension)—the slope of a secant line between 0.05% and 0.25% strain on a stress-strain curve.
   Tensile stress/strain at yield, MPa/%—tensile stress/strain corresponding to the yield point (an increase in strain does not result in an increase in stress).
   Tensile strain at break, %—tensile strain corresponding to the point of rupture
   Tensile stress at break, MPa—tensile stress corresponding to the point of rupture
4. Microscopy Investigation
   Preparation equipment: Leica RM2165 (Rotational microtome)
   Microscope: Zeiss Axiophot (Transmitted light microscope)
   Contrast technique: Transmitted light/light field pol. And λ-plate Transmitted light/dark field
5. Differential Scanning Calorimetriy DSC—According to ISO11357-3
   Instrument Perkin Elmer Diamond Hyper DSC
   Specimen type Compression moulded sheets exposed at 95° C. Sliced by microtome from surface of exposed sheet, 0-100 μm, 1-2 mg sample weight.
   Test conditions 1. Heating 20 to 225° C.
   Cooling 225 to 20° C.
   2. Heating 20 to 225° C.
   Heating/Cooling rate 10° C./min
   Number of parallels 3
   Definitions
   Temperature of melting, Tm—Peak of melting ° C.
   Temperature of crystallization, Tc—Peak of crystallization ° C.
   Enthalpy of fusion, ΔH—the heat required to melt the material at constant pressure, J/g Evaluation of Commercially Available Material Testing of PP-H-100 plates containing IRGANOX 1010, AO168 and DSTDP The unaged PP H-100 plates comprised the following antioxidant composition as determined by the described method:
   IRGANOX 1010 2680 ppm wt
   AO168 1170 ppm wt
   AO168-ox 370 ppm w
   DSTDP 4950 ppm wt 1) Determination of the Amount of AO Present in Aged Samples The amount of antioxidants present in plates aged in 30% MEA aqueous solution at different temperatures (wt ppm) is shown in the table below. AO168-ox is the oxidised form of the AO168 phosphite, i.e. the phosphate.

TABLE 2

| Additive | 0 week | 1 week | 2 weeks | 3 weeks | 5 weeks | 8 weeks | 20 weeks |
|---|---|---|---|---|---|---|---|
| 60° C. | | | | | | | |
| AO1010 | 2680 | 2810 | 2710 | 2750 | | 2740 | |
| AO168 | 1170 | 1250 | 1210 | 1230 | | 1240 | |
| AO168-ox | 370 | 300 | 290 | 290 | | 280 | |
| DSTDP | 4950 | 4850 | 4850 | 4900 | | 4700 | |
| 80° C. | | | | | | | |
| AO1010 | 2680 | 2700 | 2330 | 2110 | 1700 | 1430 | 290 |
| AO168 | 1170 | 1240 | 1190 | 1230 | 1150 | 1190 | 1000 |
| AO168-ox | 370 | 310 | 280 | 280 | 290 | 280 | 270 |
| DSTDP | | 4800 | 4700 | 4450 | | 3700 | 1650 |
| 95° C. | | | | | | | |
| AO1010 | 2680 | 2260 | 1630 | 1200 | 570 | 170 | <10 |
| AO168 | 1170 | 1230 | 1170 | 1190 | 1100 | 1090 | 390 |
| AO168-ox | 370 | 310 | 280 | 290 | 280 | 270 | 200 |
| DSTDP | 4950 | 4800 | 4250 | 3850 | | 1600 | <10 |

IRGANOX 1010 (also abbreviated AO1010) is the antioxidant with the highest reduction in concentration at all conditions, most probably due to low hydrolytic stability at alkaline conditions.

A lifetime prediction based on the results of IRGANOX 1010 depletion from PP-H 100 plates (8 mm thick) stored in 30% MEA aqueous at 60° C., 80° C. and 95° C. was also carried out.

Figure 3A:
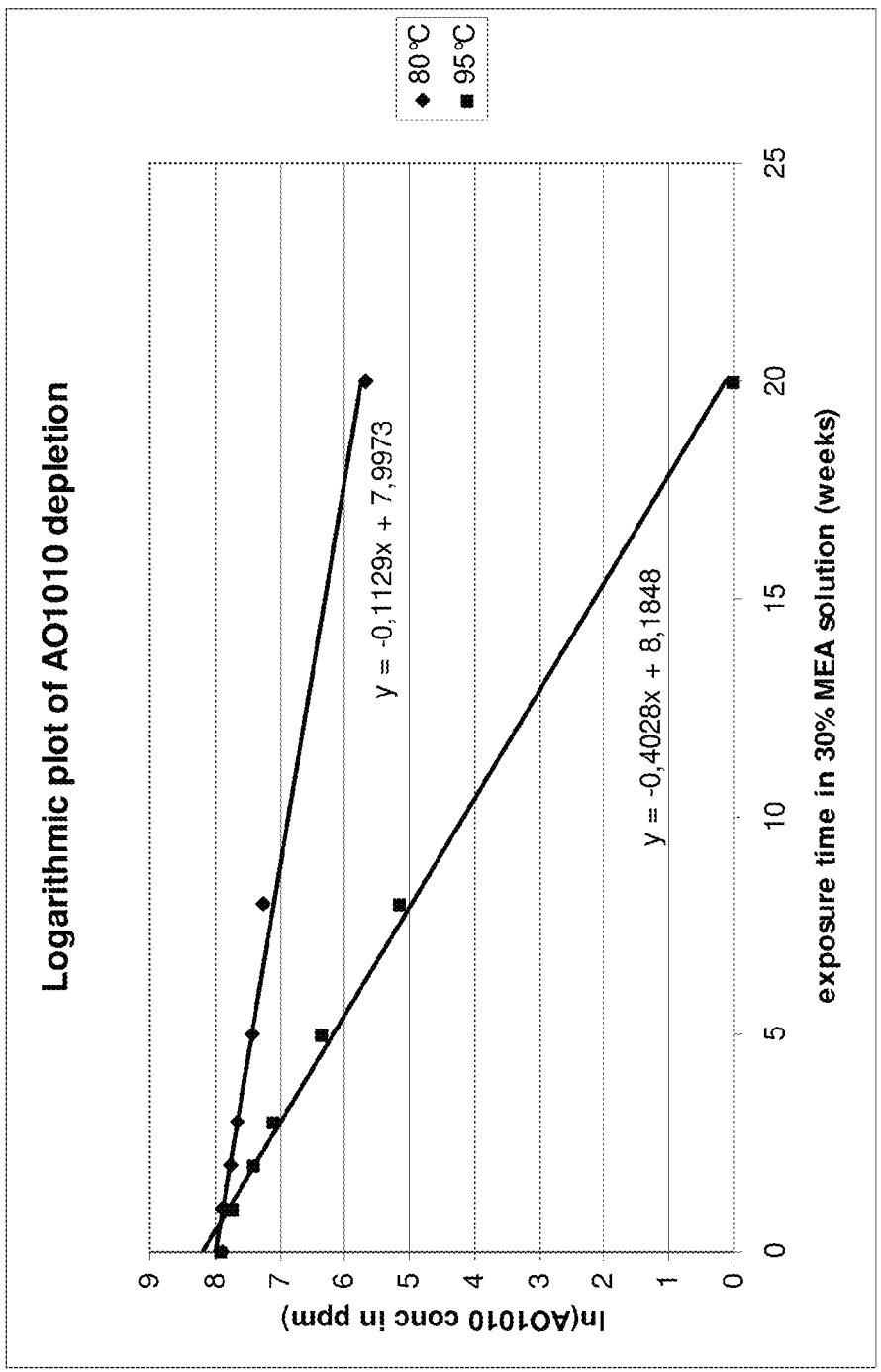
FIG. 3a shows the depletion of IRGANOX 1010 from a commercially available PP exposed to 30% MEA aqueous solution over time and FIG. 3b is an Arrhenius plot to predict lifetime at any given temperature of the PP

The logarithmic relationship between IRGANOX 1010 concentration in PP-H 100 and exposure time in 30% MEA aqueous solution at 2 different temperatures is shown in FIG. 3a below.

Using the results up to 8 weeks at 95° C., a prediction that IRGANOX 1010 concentration=1 ppm after 23 weeks was obtained. This was confirmed by the results obtained from testing at 20 weeks.

By also taking the results after 20 weeks at 80° C. into consideration the IRGANOX 1010 is expected to be 1 ppm after 72 weeks (predicted 89 weeks after 8 weeks) at 80° C.

Figure 3B:
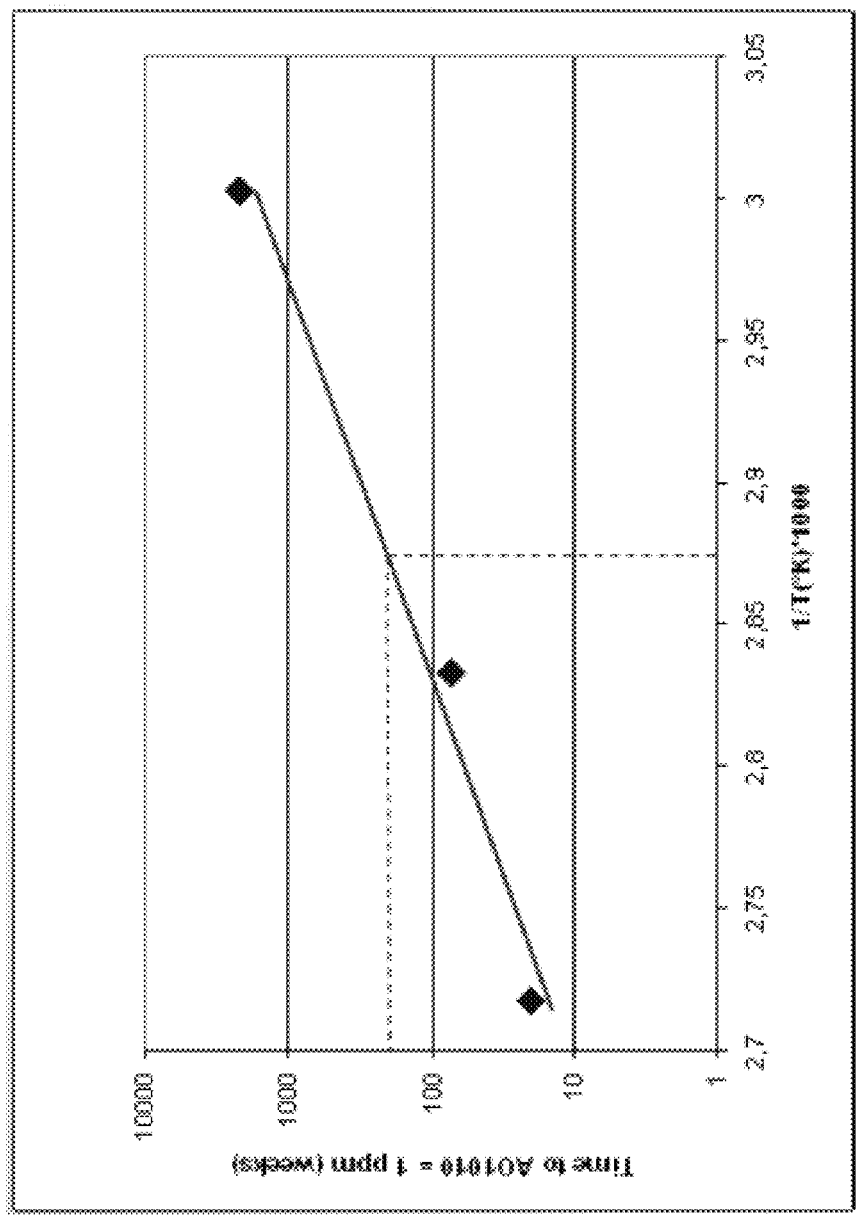

By putting the results into an Arrhenius plot (FIG. 3b) the time until AO=1 ppm at 75° C. has been calculated to be about 150 weeks (3 years) for PP-H-100 in 30% MEA aqueous solution. However some factors that may increase the lifetime are: (i) some of the hydrolysed IRGANOX 1010 may have an antioxidant effect, (ii) in this study the plates were exposed to amine from both sides whereas in operating conditions exposure will only occur from one side and (iii) the polyolefin lacking AO will still have some lifetime.

These results show that taking all factors into consideration a lifetime of the 8 mm thick PP H-100 sheets, continuously exposed by 30% MEA aqueous solution at 75° C., from one side, is been predicted to be in the range of 7-8 years.

2) Absorption Test

TABLE 3

| | Weight increase in % | | | | | |
|---|---|---|---|---|---|---|
| | 1 wk | 2 wks | 3 wks | 5 wks | 8 wks | 20 wks |
| Temp: 60° C. | 0.0 | 0.0 | 0.0 | NA | 0.03 | NA |
| Temp: 80° C. | 0.0 | 0.05 | 0.07 | 0.11 | 0.15 | 0.28 |
| Temp: 95° C. | 0.06 | 0.1 | 0.15 | 0.26 | 0.32 | 0.51 |

The weight swell of PP-H 100 is very low even at 95° C.

3) Tensile Testing

TABLE 4

| | Tensile modulus MPa | Stress at yield, MPa | Strain at yield, % | Stress at break, MPa | Strain at break, % |
|---|---|---|---|---|---|
| Reference | 1630 | 30.4 | 7.9 | 24.1 | 310 |
| 8 weeks, 60° C. | 1490 | 30.9 | 9.2 | 24.8 | 250 |
| 8 weeks, 80° C. | 1430 | 30.6 | 10.5 | 23.4 | 200 |
| 8 weeks, 95° C. | 1400 | 30.2 | 11.3 | 23.4 | 200 |
| 20 weeks, 60° C. | 1500 | 31 | 9.3 | 23.2 | 260 |
| 20 weeks, 80° C. | 1400 | 29.8 | 10.6 | 24 | 300 |
| 20 weeks, 95° C. | 1400 | 30 | 11.2 | 23.9 | 270 |

The reference materials are un-aged. The changes in mechanical properties after 20 weeks at the different conditions are all minor.

4) Microscopy Investigation

The results are shown in FIG. 4.

FIG. 4a is an unexposed reference sample. The left hand side is a LM image of a microtomed cross section. The right hand side is a SEM image of the surface.

FIG. 4b is PP-H-100 plates that have been exposed for 20 weeks in 30% MEA aqueous solution at 95° C. The left hand side is a LM image of a microtomed cross section. The right hand side is a SEM image of the surface.

No significant differences were observed in the morphology or in the surface after 20 weeks exposure. Structures seen at the surface (SEM images) are caused by artifacts (fingerprints) and variable amounts of scratches in the mould gave some variations in the surface replica. No micro cracks were observed.

5. DSC

Figure 5A:
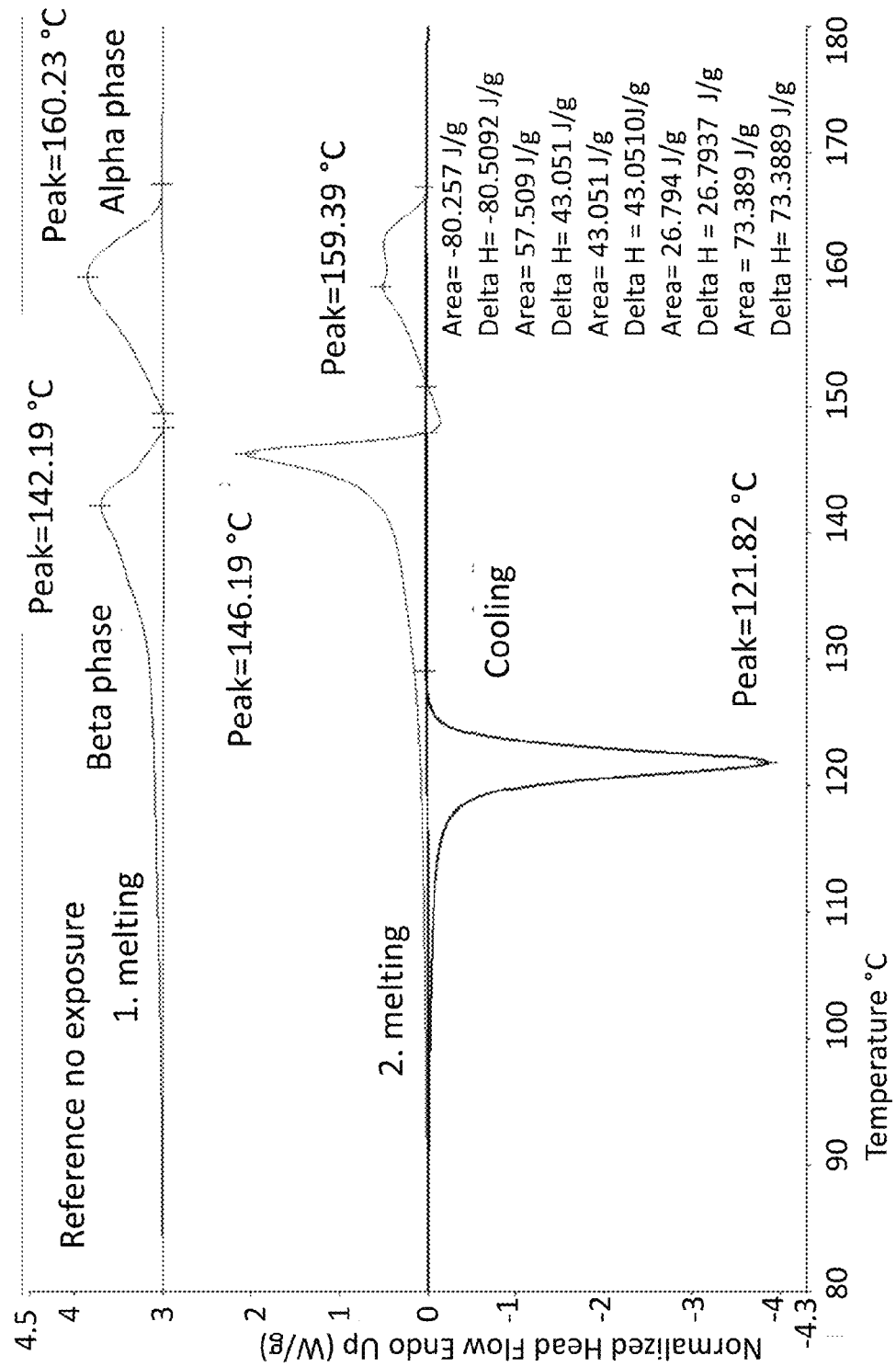
FIG. 5 shows the DSC curves of (a) unaged and ((b) and (c)) aged samples of commercially available PP
Figure 5B:
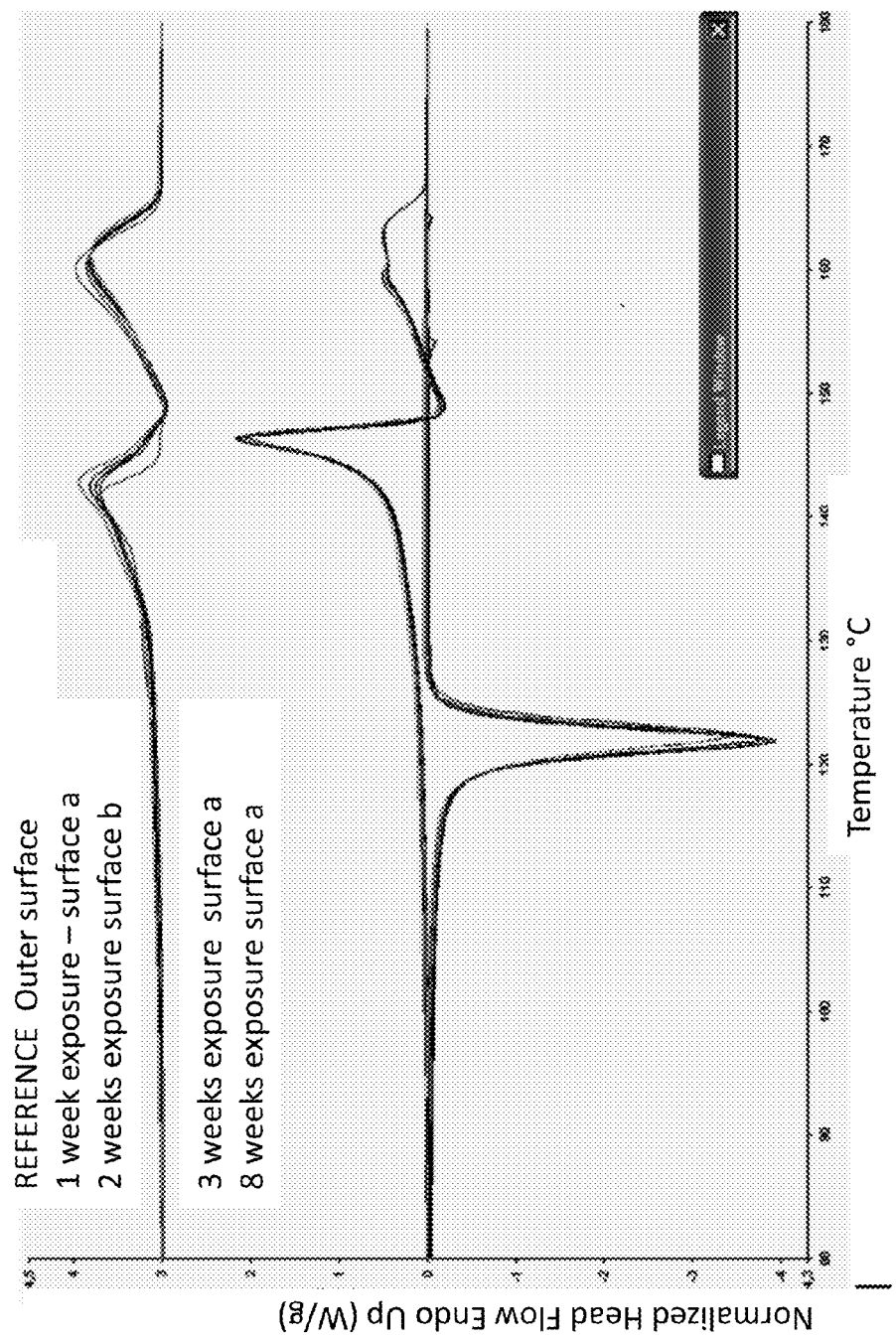
Figure 5C:
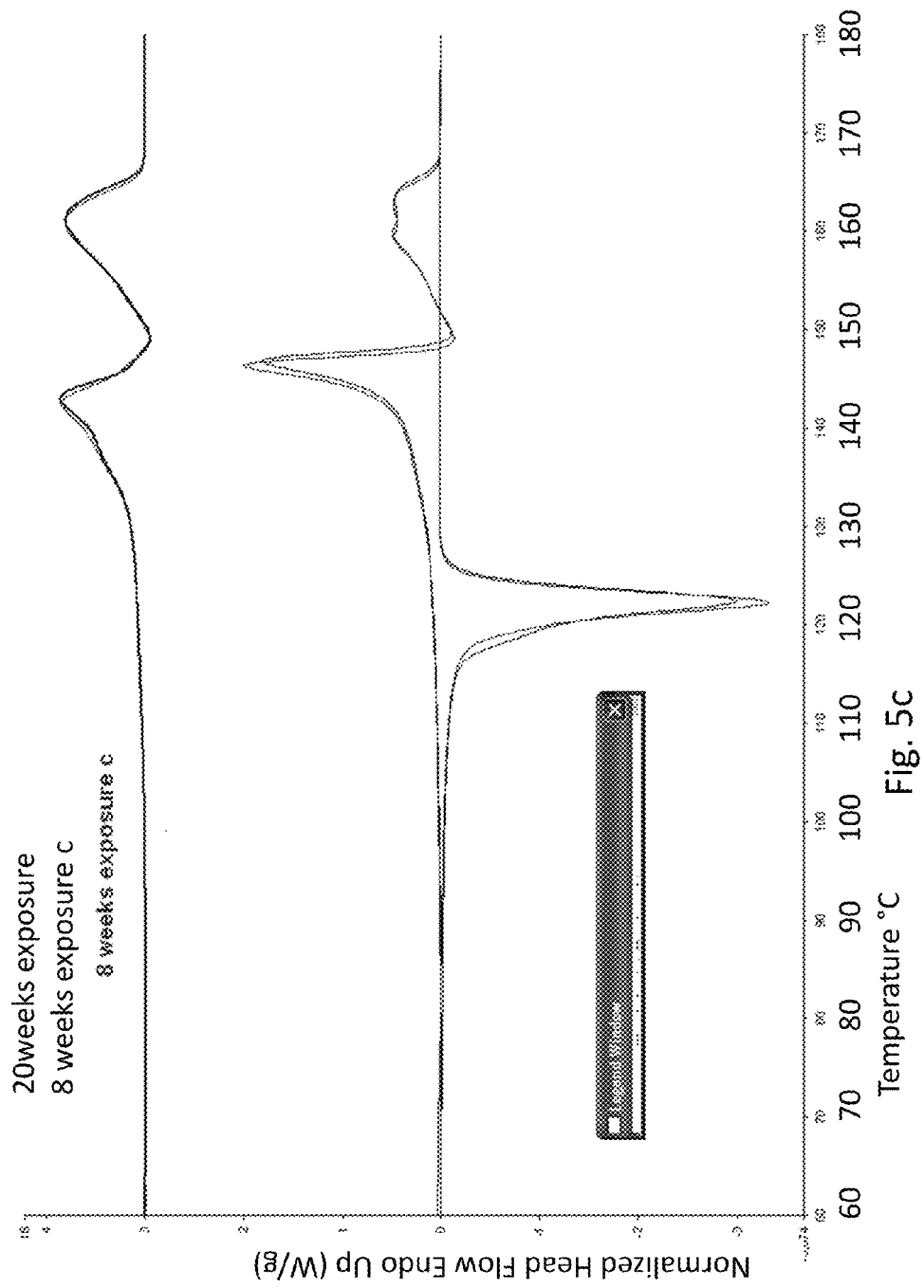

The results are shown in the table below and in the graph in FIG. 5 wherein FIG. 5a shows the DSC curve of reference material, FIG. 5b shows DSC curves of reference material compared to samples exposed for 1, 2, 3 and 8 weeks and FIG. 5c shows DSC curves of samples exposed for 8 weeks and 20 weeks.

TABLE 6

| | 1. melting | | | | 2. melting | | | | Cooling | |
|---|---|---|---|---|---|---|---|---|---|---|
| | Beta | | Alpha | | Beta | | Alpha | | | |
| | Delta H (J/g) | Peak (° C.) | Delta H (J/g) | Peak (° C.) | Delta H (J/g) | Peak (° C.) | Delta H (J/g) | Peak (° C.) | Delta H (J/g) | Peak (° C.) |
| Reference | 55 | 142.3 | 40 | 161 | 70 | 146 | 25 | 163 | −80 | 122 |
| 1 week | 57 | 142.3 | 41 | 161 | 70 | 146 | 26 | 163 | −80 | 122 |
| 2 weeks | 57 | 142.4 | 40 | 161 | 72 | 146 | 26 | 163 | −80 | 122 |
| 3 weeks | 46 | 141.5 | 45 | 160 | 75 | 146 | 26 | 160 | −80 | 122 |
| 8 weeks | 60 | 142.5 | 39 | 161 | 71 | 146 | 25 | 163 | −79 | 122 |
| 20 weeks | 56 | 143.1 | 38 | 161 | 67 | 146 | 26 | 160 | −81 | 122 |

DSC shows no significant change in β-phase due to exposure at 95° C., 20 weeks.

Testing of BE60-7032 Plates Containing IRGANOX 1010, IRGANOX 1330, DSTDP and SHT The un-aged plates comprised the following composition as determined by the described method:
IRGANOX 1010 2880 ppm wt
AO 1330 4250 ppm wt
DSTDP 4900 ppm wt
SHT 1000 ppm wt 1) Determination of the Amount of AO Present in Aged Samples The amount of antioxidants present in plates aged in amine solutions at different temperatures (wt ppm) is shown in the table below.

Aged in used aqueous solution of AMP and AEP (wt ppm)

TABLE 7

| Additive | 0 week | 1 week | 2 weeks | 3 weeks | 5 weeks | 8 weeks | 12 weeks |
|---|---|---|---|---|---|---|---|
| | | | 80° C. | | | | |
| AO 1010 | 2880 | 2720 | 2650 | | 2400 | 1880 | 1540 |
| AO 1330 | 4250 | 4490 | 4030 | | 4140 | 3920 | 3850 |
| DSTDP | 4900 | 4550 | 4500 | | 4400 | 4150 | 4000 |
| | | | 95° C. | | | | |
| AO 1010 | 2880 | 2570 | 2230 | | 1080 | 470 | 30 |
| AO 1330 | 4250 | 4050 | 4200 | | 3940 | 4200 | 3700 |
| DSTDP | 4900 | 4650 | 4450 | | 3650 | 2600 | 1350 |

Aged in new 30% MEA aqueous (wt ppm)

TABLE 8

| Additive | 0 week | 1 week | 2 weeks | 3 weeks | 5 weeks | 8 weeks | 12 weeks |
|---|---|---|---|---|---|---|---|
| | | | 80° C. | | | | |
| AO 1010 | 2880 | 2750 | 2620 | 2500 | 2050 | 1750 | 1500 |
| AO 1330 | 4250 | 4450 | 4430 | 4150 | 4050 | 4340 | 4170 |
| DSTDP | 4900 | 4850 | 4550 | 4450 | 4200 | 3700 | 3150 |
| | | | 95° C. | | | | |
| AO 1010 | 2880 | 2550 | 1900 | 1340 | 820 | 520 | 120 |
| AO 1330 | 4250 | 4150 | 4470 | 4470 | 4160 | 4020 | 3940 |
| DSTDP | 4900 | 4600 | 4050 | 3500 | 2600 | 2000 | 1050 |

Testing has been performed in two different amines, i.e. 30% aqueous solution of MEA and aqueous solution of a mixture of AEP and AMP, which has been used for carbon capture for several months. The rationale for the selection of solvents is to clarify if there is a significant difference between different amines and also to investigate if amine degradation products have a detrimental effect on the polypropylene.

The results show that IRGANOX 1330 is not significantly depleted after exposure to either of the two solutions.

A lifetime prediction based on the results of IRGANOX 1010+AO1330 depletion from BE60-7032 plates (8 mm thick) stored in new 30% MEA aqueous solution and used aqueous solution of AMP and AEP at 80° C. and 95° C. was also carried out.

Figure 6A:
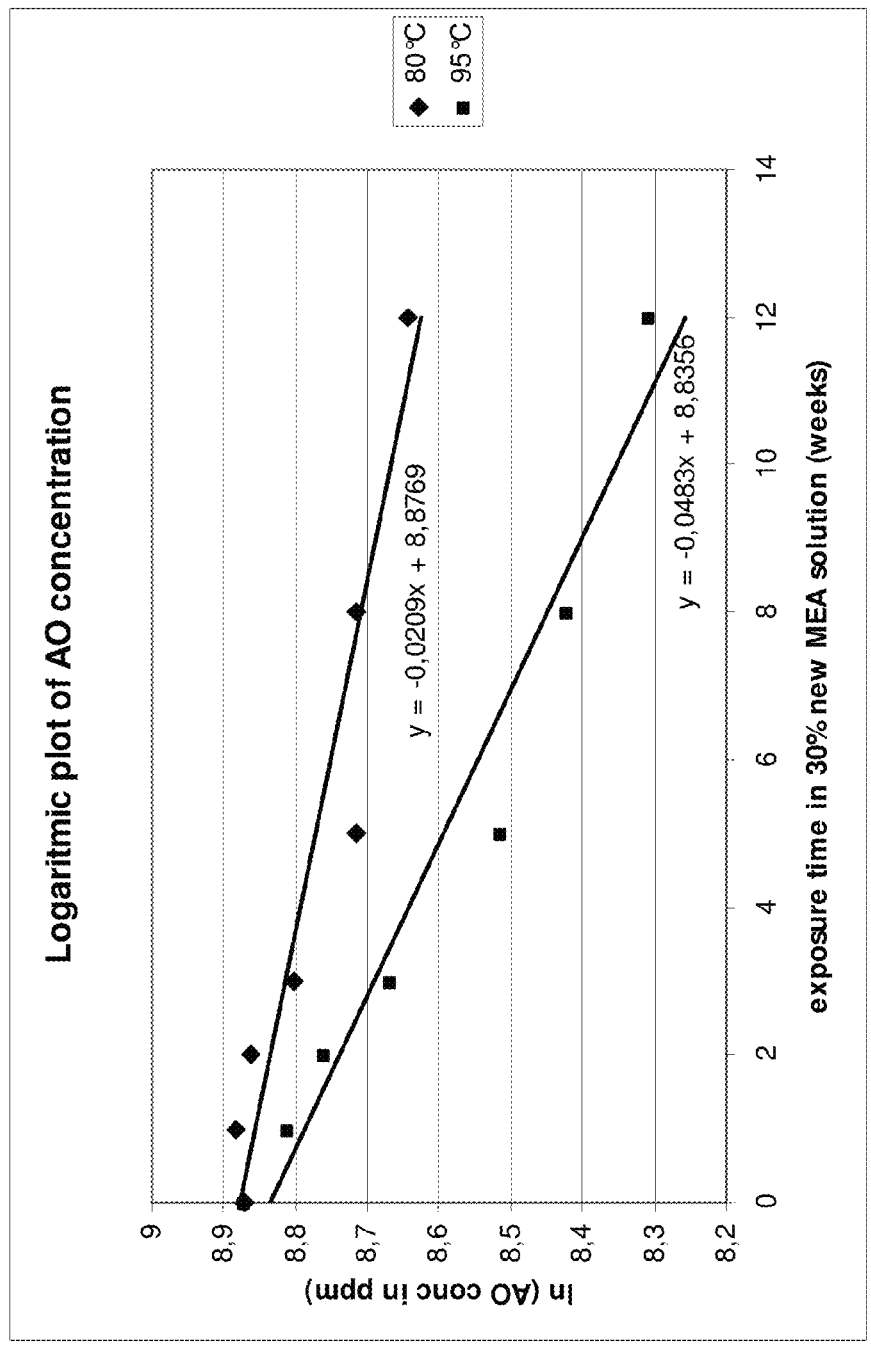
FIGS. 6a and 6b show the depletion of IRGANOX 1010+ IRGANOX 1330 from a polyolefin composition of the invention exposed to new 30% aquous MEA solution and used aqueous solution of 2-amino-2-methyl-1-propanol (AMP) and 1-(2-aminoethyl)-piperazine (AEP) over time and 6c is an Arrhenius plot to predict lifetime at any given temperature of the polyolefin composition.
Figure 6B:
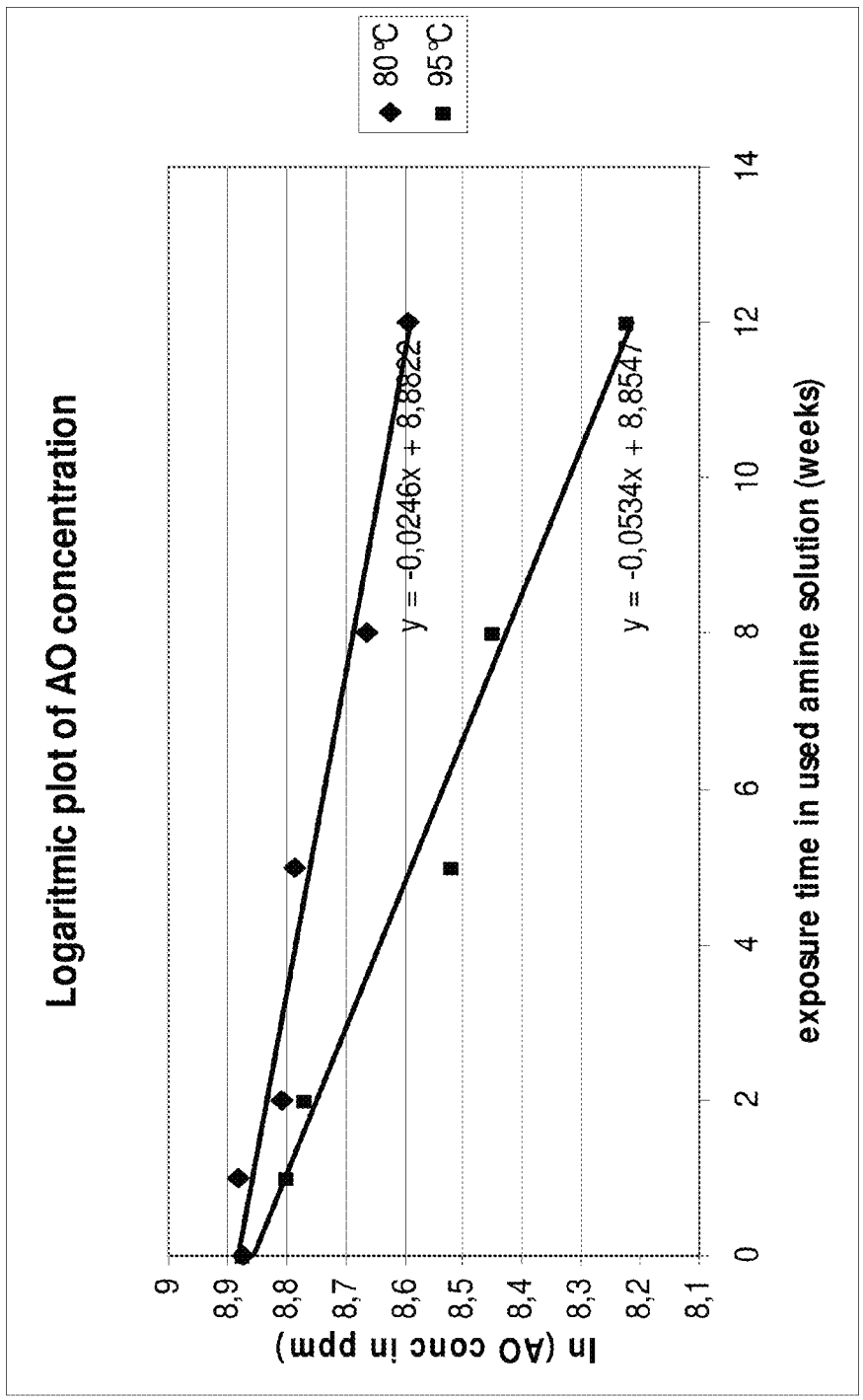

The logarithmic relationship between AO (IRGANOX 1010+AO1330) concentration in BE60-7032 plates and exposure time in both new 30% MEA aqueous solution and used aqueous solution of AMP and AEP at 80° C. and 95° C. is shown in FIGS. 6a and 6b below.

By use of the equations as shown in the figures the time until the concentration of IRGANOX 1010+IRGANOX 1330=1 ppm can be calculated, and the results are shown in comparison with the results of commercially available PP-H 100 in the table below.

TABLE 9

|  | 95° C. | 80° C. |
|---|---|---|
| PP-H 100 (in 30% new MEA) | 20 weeks | 72 weeks |
| BE60-7032 + IRGANOX 1330 + SHT (in 30% new MEA) | 183 weeks | 424 weeks |
| BE60-7032 + IRGANOX 1330 + SHT (in used aqueous solution of AMP and AEP) | 166 weeks | 361 weeks |

These results show more than 5 times prolonged time until AO=1 ppm by adding IRGANOX 1330 and SHT at both 95° C. and 80° C.

Figure 6C:
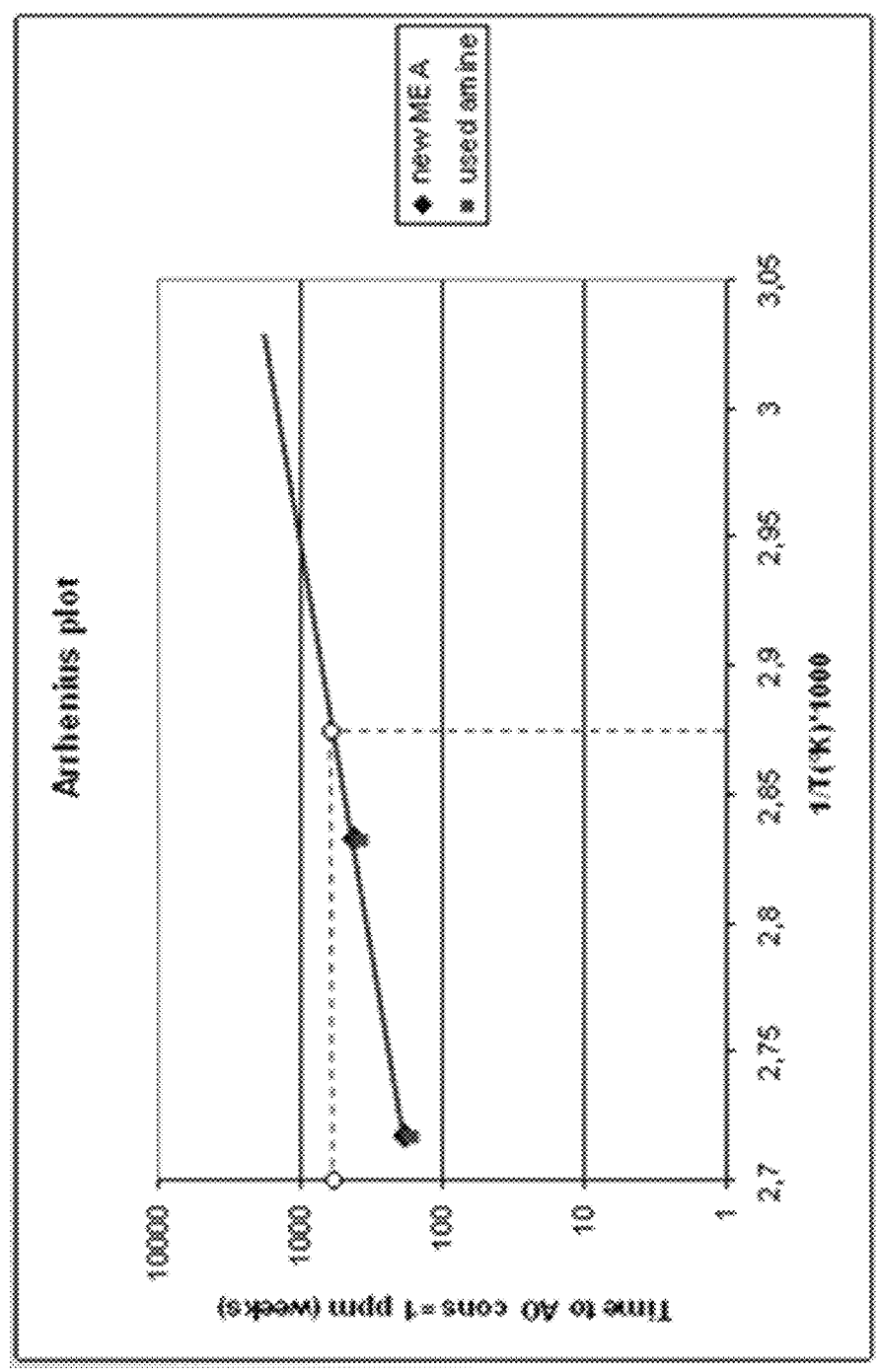

By putting the results into an Arrhenius plot (FIG. 6c) the time until AO=1 ppm at 75° C. has been calculated to be about 650 weeks (12.5 years) for both new MEA and the used amine solution.

Taking all factors into consideration a lifetime of the 8 mm thick BE60-7032 with IRGANOX 1330 and SHT, continuously exposed by amine (new or used) aqueous solution at 75° C., from one side, has been predicted to be >15 years, most probably close to 20 years.

Testing on Double Plates

All testing described above, has been carried out on 8 mm thick plates in 30% aqueous MEA solution, i.e. amine exposure at both sides. To better simulate real conditions wherein amine exposure only occurs from one side, two 8 mm plates were welded together giving a total thickness of 16 mm. Both 8 mm and 16 mm plates were aged for 15 weeks in 30% MEA aqueous solution at 80° C. and 95° C., and the content of remaining antioxidants analysed.

Antioxidants (ppm) in plates before ageing:

TABLE 10

| IRGANOX 1010 | 2880 |
|---|---|
| IRGANOX 1330 | 4250 |
| IRGANOX 1010 + IRGANOX 1330 | 7130 |
| DSTDP | 4900 |

Antioxidants (ppm) in plates aged in new 30% MEA (wt ppm) for 15 weeks:

TABLE 11

| Sample | AO1010 | AO1330 | AO1010 + AO1330 | DSTDP |
|---|---|---|---|---|
| 80° C., side A, double plate | 1580 | 4010 | 5590 | 3350 |
| 80° C., side B, double plate | 1610 | 3970 | 5580 | 3400 |
| 95° C., side A, double plate | 50 | 3780 | 3830 | 880 |
| 95° C., side B, double plate | 30 | 3910 | 3940 | 860 |
| 80° C., single plate | 1390 | 4280 | 5670 | 3000 |
| 95° C., single plate | 10 | 4040 | 4050 | 700 |

Single Plates

The time until concentration of IRGANOX 1010+IRGANOX 1330=1 ppm was estimated based on results until 15 weeks ageing:

TABLE 12

|  | 95° C. | 80° C. |
|---|---|---|
| BE60-7032 + IRGANOX 1330 (in 30% new MEA) | 223 weeks | 495 weeks |

Figure 7A:
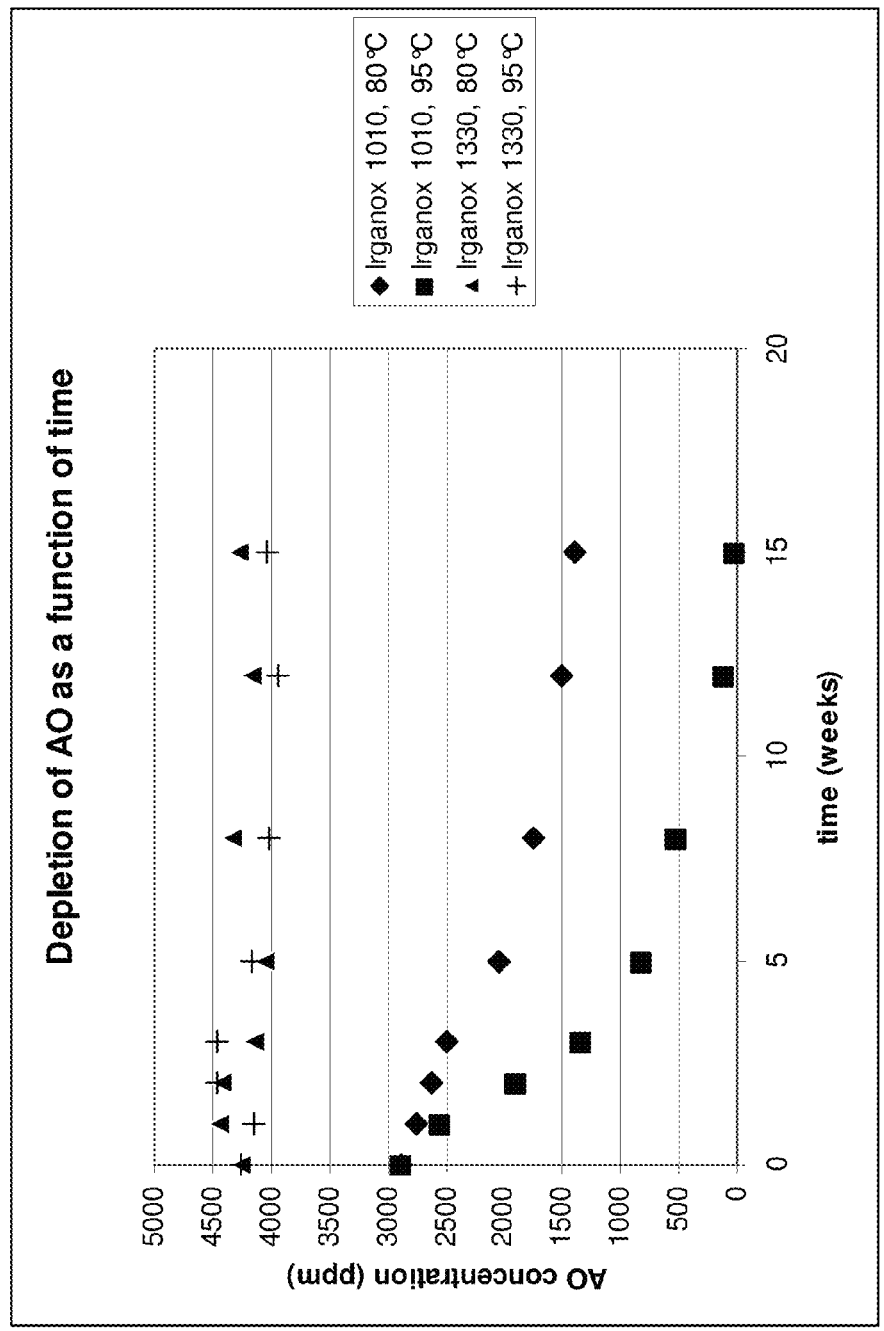
FIG. 7a separately shows the depletion of IRGANOX 1010 and IRGANOX 1330 from a polyolefin composition of the invention exposed to new 30% MEA aqueous solution over time and FIG. 7b is an Arrhenius plot determining to predict lifetime at any given temperature of the polyolefin composition

The depletion of AO as a function of time is shown FIG. 7a.

These results show very little reduction in IRGANOX 1330 concentrations both at 80° C. and 95° C. There may be different reasons for this:

a) The very good hydrolytic stability of IRGANOX 1330 b) IRGANOX 1010 and the hydrolysed IRGANOX 1010 may react quicker than IRGANOX 1330 with peroxy-radicals, stopping polymer degradation.

By this the IRGANOX 1330 molecules are "protected" as long as active IRGANOX 1010 and hydrolysed IRGANOX 1010 molecules exist in the polymer.

Lifetime Prediction at 65° C.

Figure 7B:
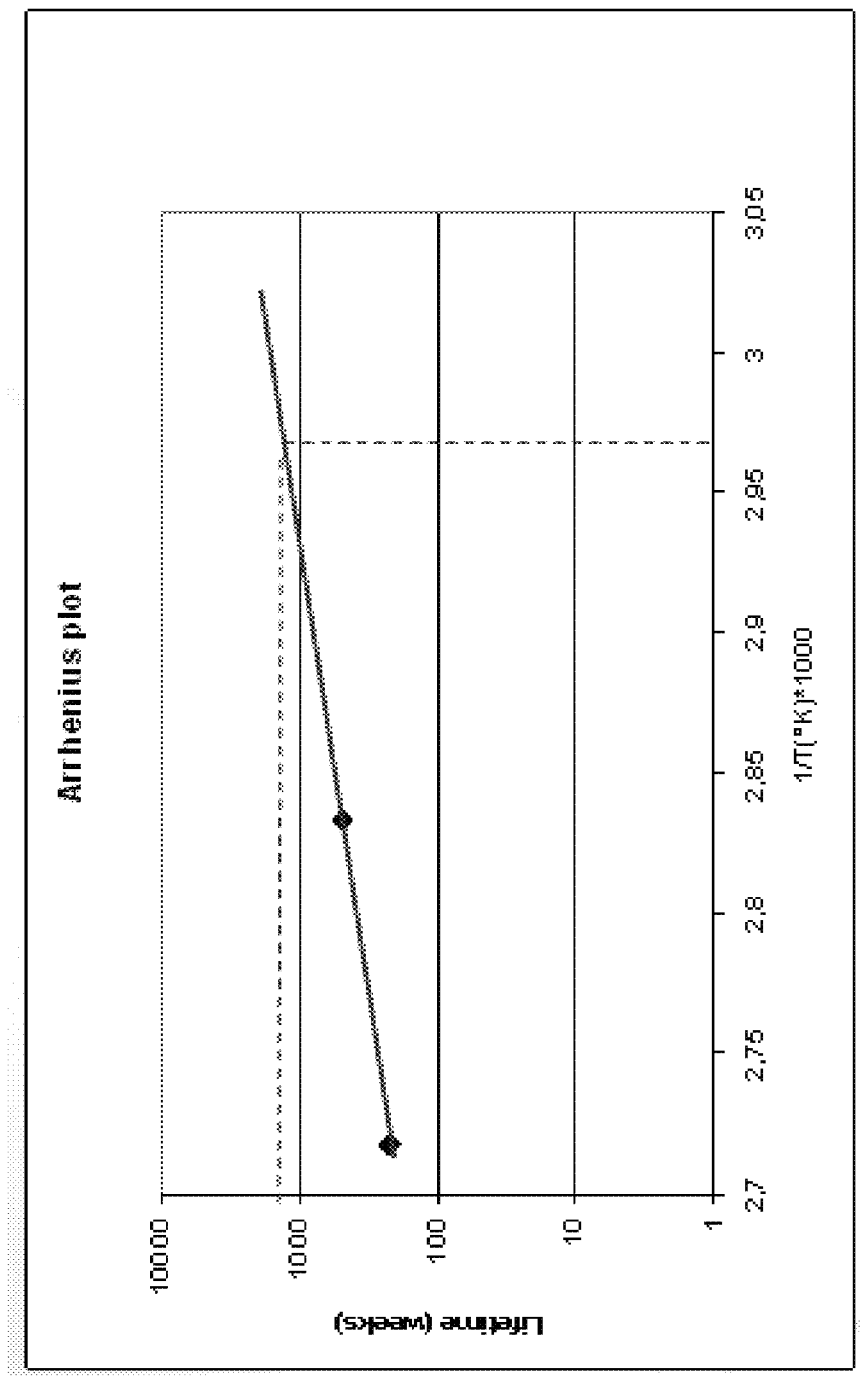

By putting these results into an Arrhenius plot, as shown in the FIG. 7b, a lifetime of the 8 mm thick BE60-7032 liner with IRGANOX 1330, continuously exposed by 30% MEA solution at 65° C. can be estimated.

This estimate shows a lifetime of 1300 weeks (25 years) at 65° C. with amine exposure at two sides. By using the change in IRGANOX 1010+IRGANOX 1330 concentration for the lifetime prediction, the predictions made after short storage time (e.g. 15 weeks) will mainly be influenced by IRGANOX 1010 hydrolysis. The lifetime predictions are therefore underestimates.

Taking all factors into consideration a lifetime of the 8 mm thick BE60-7032 with IRGANOX 1330, continuously exposed by 30% MEA (new or used) solution at 65° C., from one side, has been predicted to be >25 years, most probably also >30 years.

2) Absorption Test

New amine

TABLE 13

|  | 1 wk | 2 wks | 3 wks | 8 wks | 12 wks |
|---|---|---|---|---|---|
| Temp.: 80° C. |  |  |  |  |  |
| Weight increase in % | 0.0 | 0.07 | 0.06 | 0.17 | 0.21 |
| Temp.: 95° C. |  |  |  |  |  |
| Weight increase in % | 0.08 | 0.11 | 0.17 | 0.52 | 0.53 |

New amine—double plate, welded samples

TABLE 14

|  | 15 weeks |
|---|---|
| Temp.: 80° C. | |
| Weight increase in % | 0.22 |
| Temp.: 95° C. | |
| Weight increase in % | 0.74 |

Used amine

TABLE 15

|  | 1 wk | 2 wks | 3 wks | 8 wks | 12 wks |
|---|---|---|---|---|---|
| Temp.: 80° C. | | | | | |
| Weight increase in % | 0.0 | 0.0 | NA | 0.09 | 0.10 |
| Temp.: 95° C. | | | | | |
| Weight increase in % | 0.07 | 0.09 | NA | 0.24 | 0.33 |

The weight swell of PP-H 100 is very low even at 95° C. both in used and new amine.

3) Tensile Strength

New amine

TABLE 17

|  | Tens. Mod., MPa | Stress at yield, MPa | Strain at yield, % | Stress at break, MPa | Strain at break, % |
|---|---|---|---|---|---|
| Reference | 1400 | 29.3 | 8.1 | 24.1 | 250 |
| 8 weeks, 80° C. | 1310 | 30.2 | 10.6 | 22 | 250 |
| 12 weeks, 80° C. | 1300 | 30.2 | 10.7 | 22.7 | 260 |
| 8 weeks, 95° C. | 1310 | 29.9 | 11.6 | 22.6 | 210 |
| 12 weeks, 95° C. | | | | | |

Used amine

TABLE 18

|  | Tens. Mod., MPa | Stress at yield, MPa | Strain at yield, % | Stress at break, MPa | Strain at break, % |
|---|---|---|---|---|---|
| Reference | 1400 | 29.3 | 8.1 | 24.1 | 250 |
| 8 weeks, 80° C. | 1320 | 30.4 | 10.4 | 22.3 | 160 |
| 12 weeks, 80° C. | 1240 | 30 | 11 | 21.1 | 200 |
| 8 weeks, 95° C. | 1290 | 30 | 11.3 | 21.7 | 140 |
| 12 weeks, 95° C. | 1200 | 29.5 | 11.8 | 22.1 | 240 |

The reference materials are all un-aged. The changes in mechanical properties after 8 and 12 weeks at the different conditions are all minor.

4) Microscopy Investigation

The results are shown in FIG. 8.

FIG. 8*a* is a reference sample. The left hand side is a LM image of a microtomed cross section. The right hand side is a SEM image of the surface.

FIG. 8*b* is BE60-7032 plates that have been exposed for 12 weeks in 30% MEA in water solution at 95° C. (new MEA). The left hand side is a LM image of a microtomed cross section. The right hand side is a SEM image of the surface.

Figure 8C:
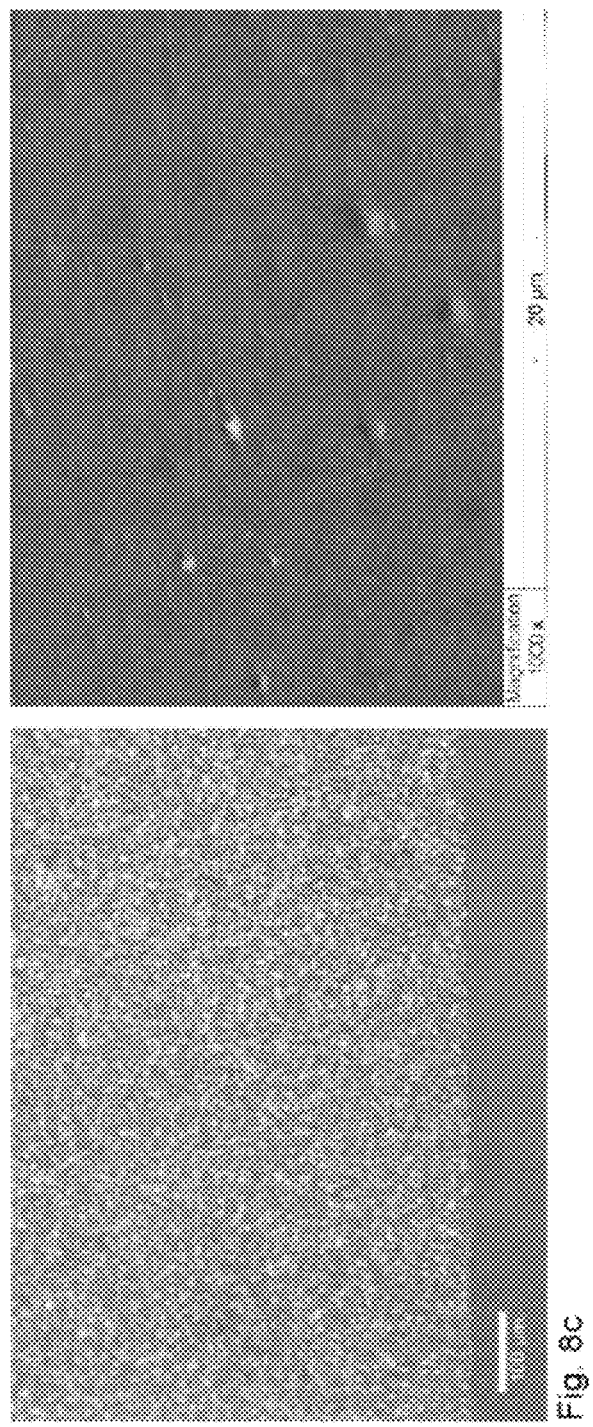

FIG. 8*c* is BE60-7032 plates that have been exposed for 12 weeks in amine water solution at 95° C. (used AMP/AEP mixture). The left hand side is a LM image of a microtomed cross section. The right hand side is a SEM image of the surface.

No significant differences were observed in the morphology and in surface after 12 weeks exposure. Structures seen at the surface (SEM images) are caused by artifacts (fingerprints) and variable amounts of scratches in the mould giving some variations in the surface replica. No micro cracks were observed in any of the inspected samples.

5. DSC

Figure 9A:
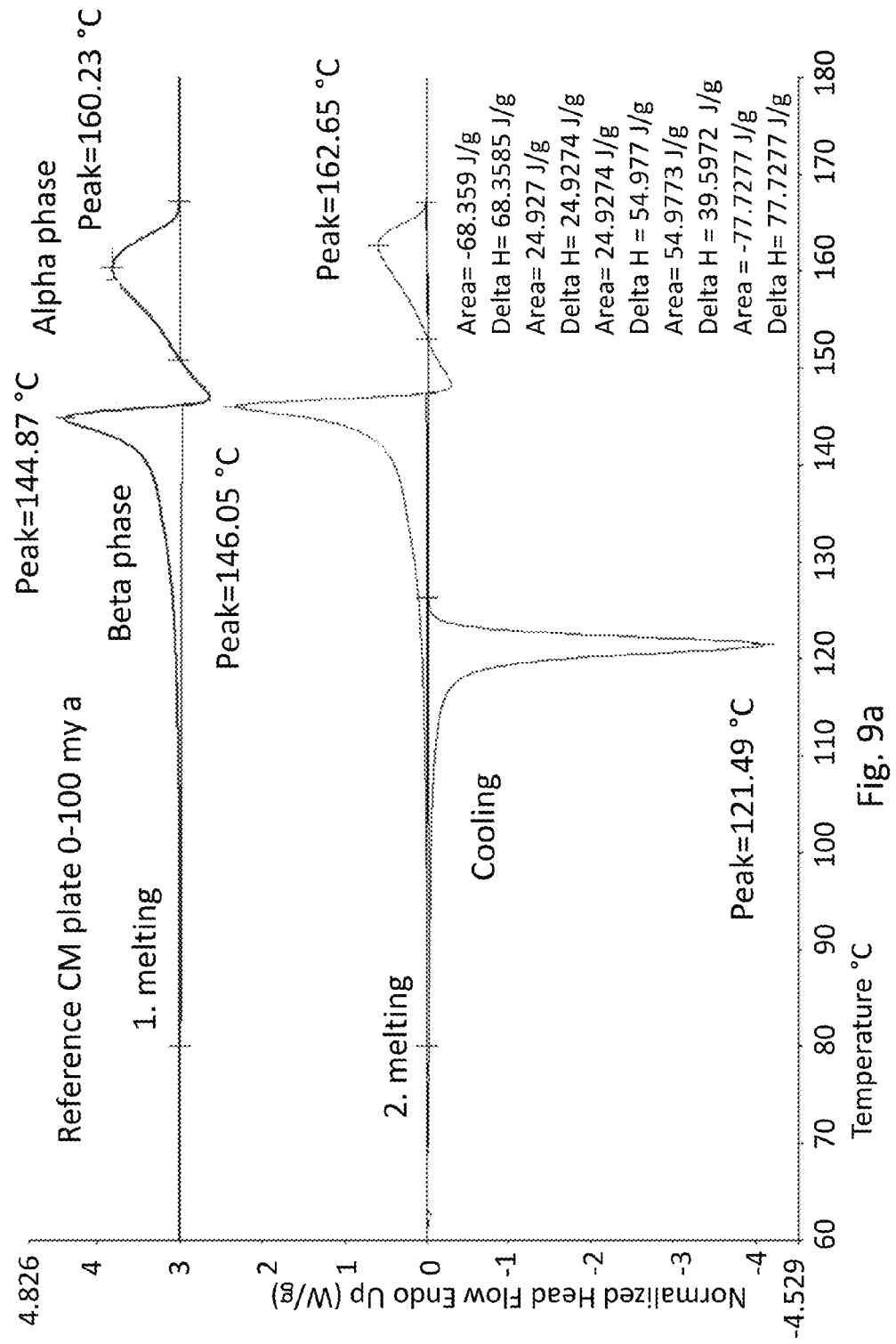
FIGS. 9a-c show the DSC curves of unaged and aged samples of polyolefin composition used in the present invention.
Figure 9B:
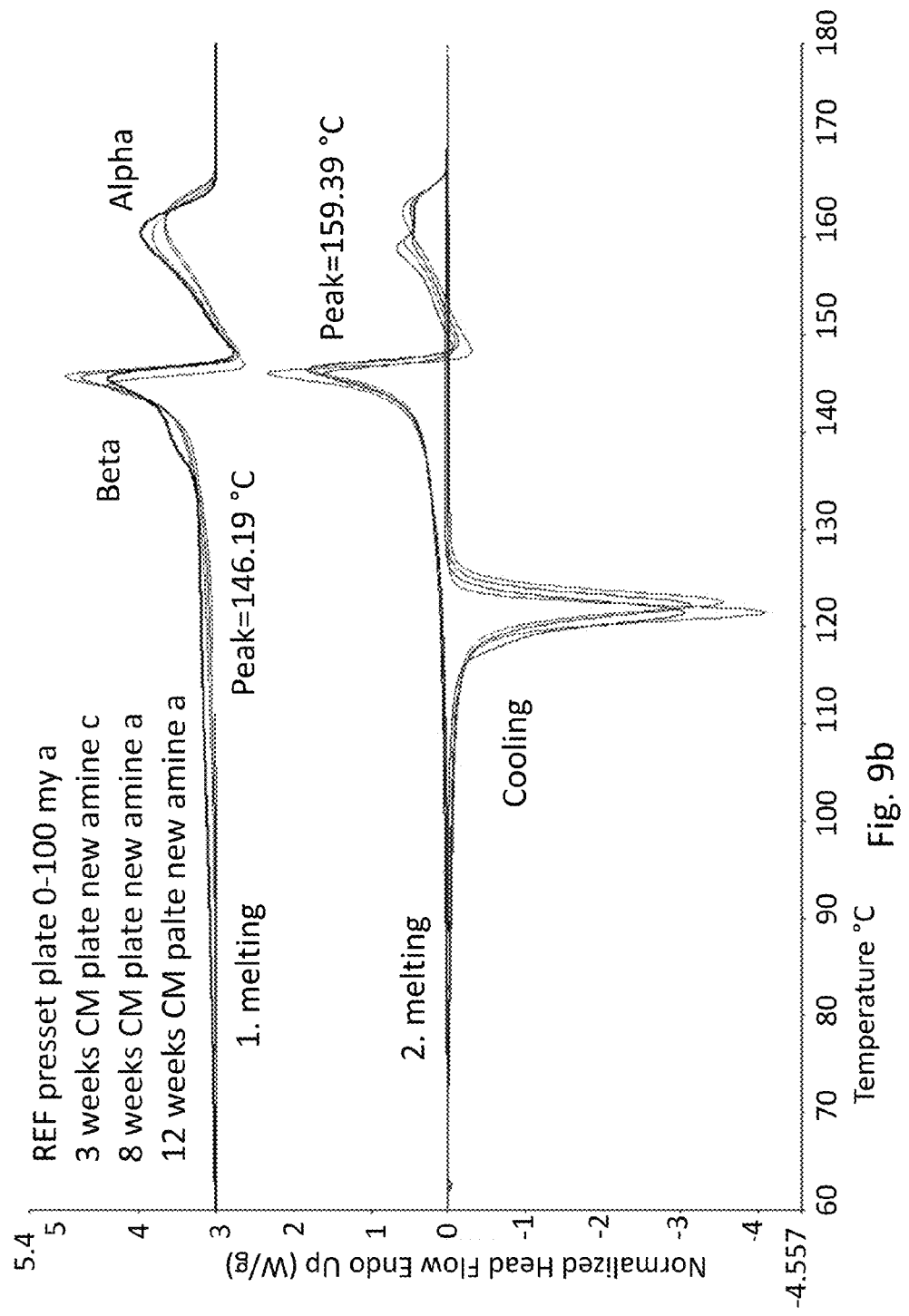
Figure 9C:
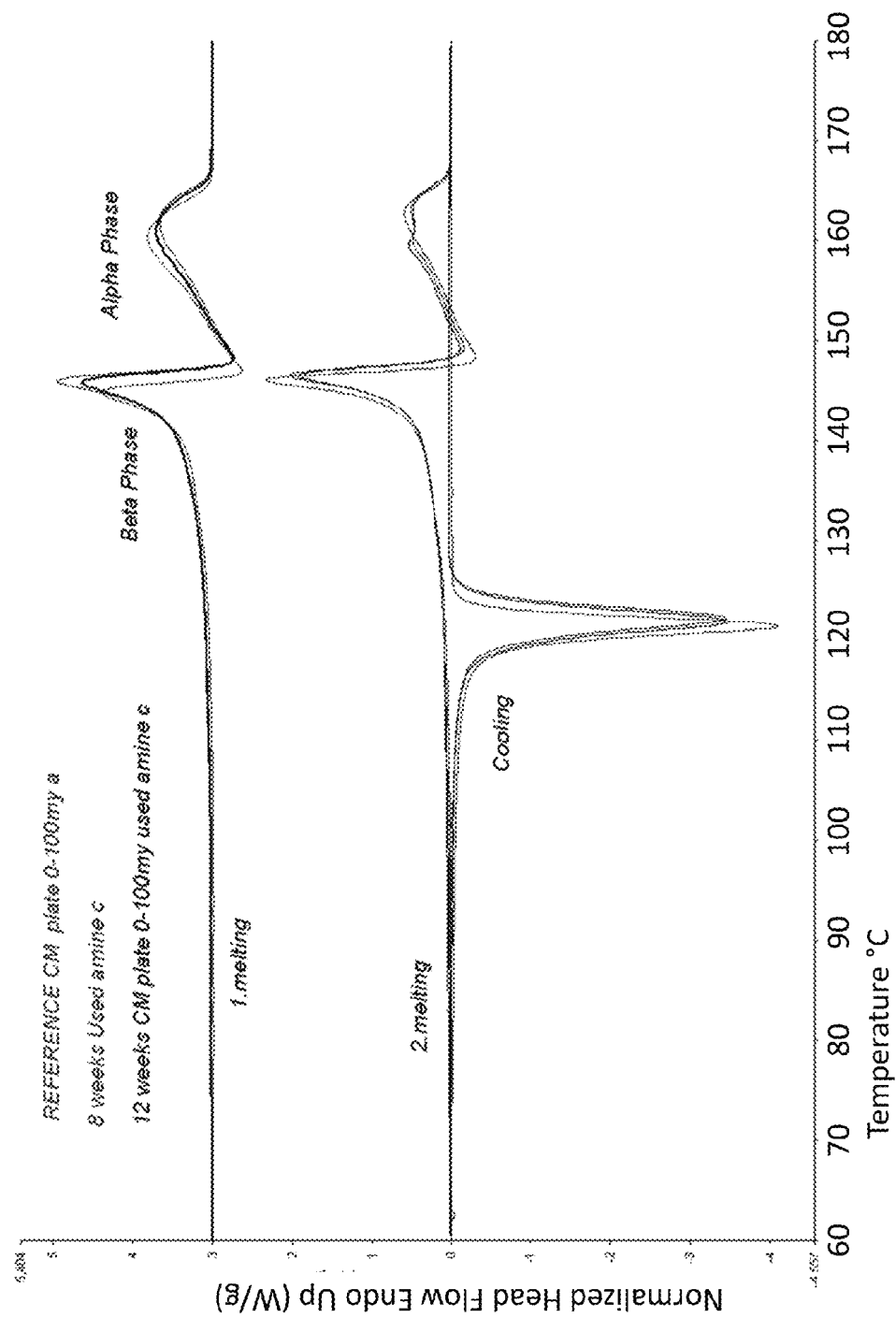

The results are shown in the tables below and in the graphs in FIG. 9 wherein FIG. 9*a* shows the DSC curve of reference material, FIG. 9*b* shows the DSC curves of reference material compared to samples exposed to new amine for 3, 8 and 12 weeks and FIG. 9*c* shows the DSC curves of reference material compared to samples exposed to used amine for 8 and 12 weeks.

New amine

TABLE 19

|  | 1. melting | | | | 2. melting | | | | Cooling | |
|---|---|---|---|---|---|---|---|---|---|---|
|  | Beta | | Alpha | | Beta | | Alpha | | | |
|  | Delta H (J/g) | Peak (° C.) | Delta H (J/g) | Peak (° C.) | Delta H (J/g) | Peak (° C.) | Delta H (J/g) | Peak (° C.) | Delta H (J/g) | Peak (° C.) |
| Reference | 50 | 145 | 39 | 160 | 67 | 146 | 25 | 163 | −78 | 121 |
| 3 week | 66 | 146 | 33 | 162 | 70 | 147 | 25 | 163 | −78 | 123 |
| 8 weeks | 80 | 146 | 32 | 162 | 76 | 147 | 28 | 160 | −81 | 123 |

Used amine

TABLE 20

|  | 1. melting | | | | 2. melting | | | | Cooling | |
| --- | --- | --- | --- | --- | --- | --- | --- | --- | --- | --- |
|  | Beta | | Alpha | | Beta | | Alpha | | | |
|  | Delta H (J/g) | Peak (° C.) | Delta H (J/g) | Peak (° C.) | Delta H (J/g) | Peak (° C.) | Delta H (J/g) | Peak (° C.) | Delta H (J/g) | Peak (° C.) |
| Reference | 50 | 145 | 39 | 160 | 67 | 146 | 25 | 163 | −78 | 121 |
| 2 weeks + 2 days | 61 | 145 | 36 | 161 | 68 | 146 | 23 | 163 | −78 | 122 |
| 8 weeks | 73 | 146 | 32 | 162 | 72 | 146 | 25 | 163 | −80 | 122 |
| 12 weeks | 62 | 146 | 35 | 161 | 67 | 147 | 26 | 161 | −81 | 122 |

Ageing at 130° C. After Ageing in Amine Solution at 95° C.

a) Sample P1 and P2

The compositions of Sample P1 and Sample P2 used in the test are shown in the table below. Both samples are based on the same polymer. Table 21, below, shows the antioxidant composition as analysed before ageing, whereas the concentration of SHT is the concentration as added, and was not analysed.

TABLE 21

| Sample | Polymer | | AO1010 (ppm) | AO1330 (ppm) | DSTDP (ppm) | SHT (ppm) |
| --- | --- | --- | --- | --- | --- | --- |
| P1 | BE60-7032 (PP-H 100) | β- nucleated polypropylene homo-polymer | 2680 | 0 | 4950 | 0 |
| P2 | BE60-7032 | β- nucleated polypropylene homo-polymer | 2530 | 4900 | 4900 | 1000 |

Figure 10A:
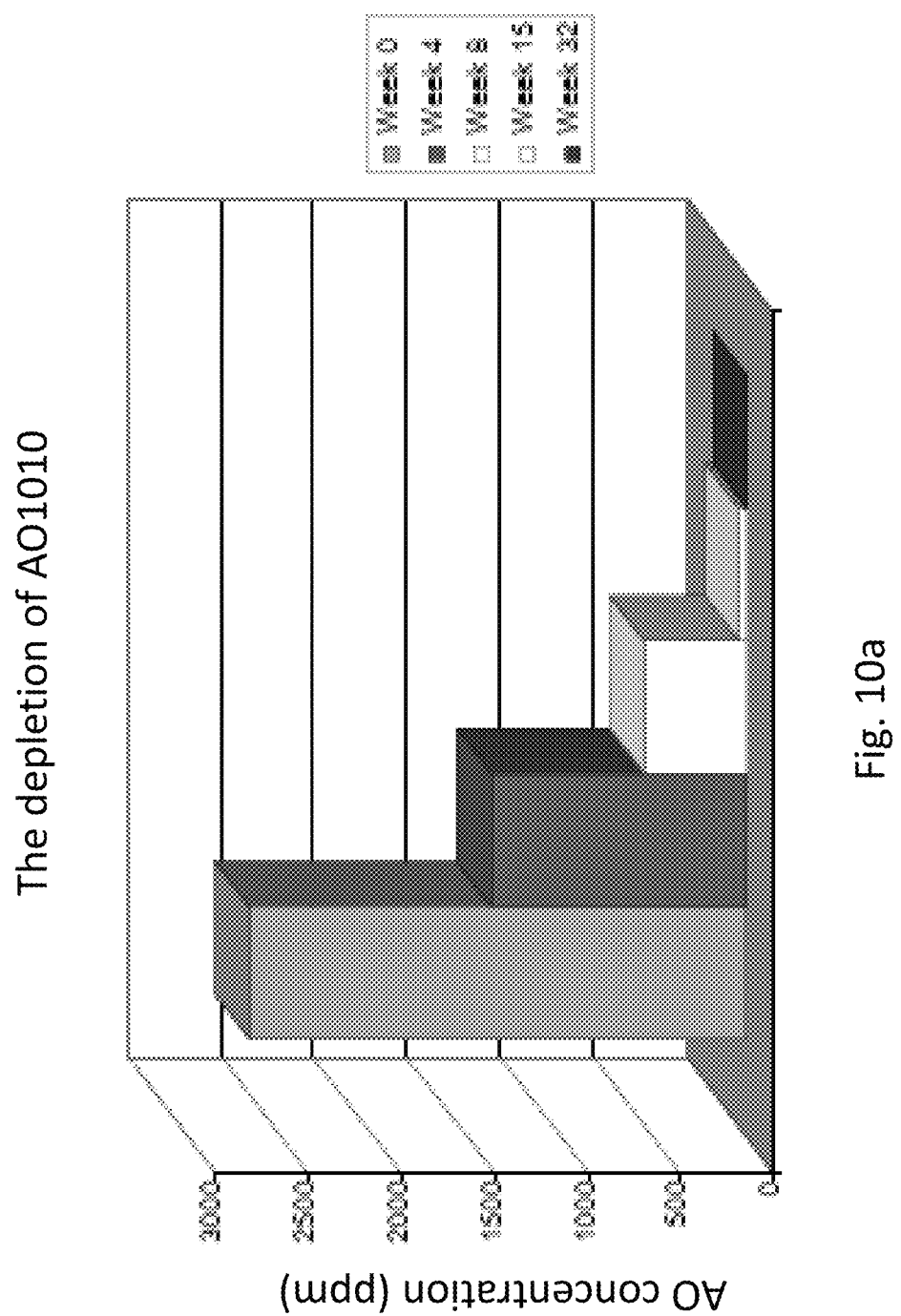
FIGS. 10a-b illustrate the depletion of IRGANOX 1010 and IRGANOX 1330 in hot amine solution, FIG. 11 are pictures of test specimens after a period of ageing.
Figure 10B:
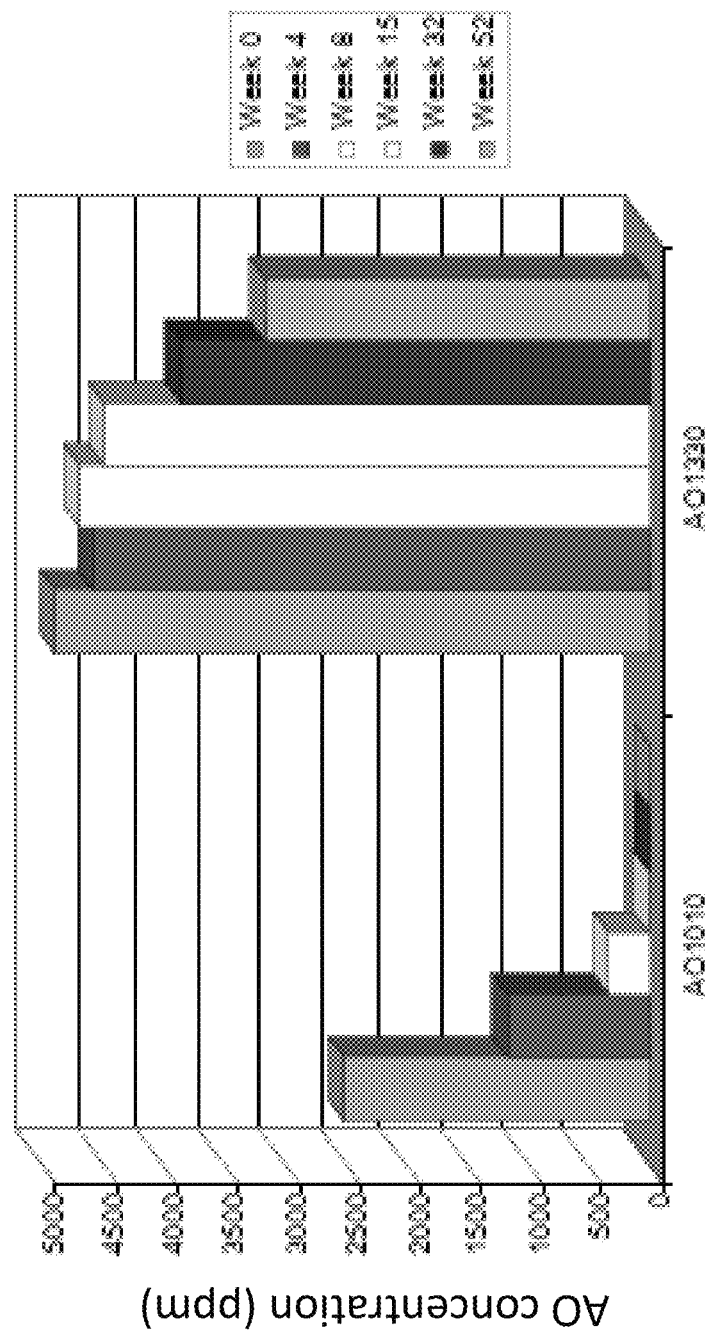

Initially and before the ageing in this study Samples P1 and P2 were aged in a piperazine/AMP solution (0.45 M piperazine+0.9 M AMP)(pH-12.5) at 95° C., P1 for 36 weeks and P2 for 52 weeks. The measured of the added antioxidants are illustrated in FIGS. 10a and 10b for IRGANOX 1010 and AO1020 in combination with IRGANOX 1330, respectively. No measurable IRGANOX 1010 was found in P1 or P2 after 32 weeks, whereas 65% of the IRGANOX 1330 remains in Sample P2 after 1 year (52 weeks) of ageing.

Although no IRGANOX 1010 remains in Sample P1 the mechanical properties after 36 weeks of ageing are almost unchanged. Also for Sample P2 the mechanical properties are almost unchanged after 52 weeks of ageing.

These pre-aged samples were placed in an oven at 130° C., with circulated air (i.e. higher temperature and easier access to oxygen compared to the ageing in piperazine+AMP solution) and visually inspected until 14 weeks of ageing at 130° C., then the samples were mechanical tensile tested.

B) Sample P5 and P10

The compositions of Sample P5 and Sample P10 are shown in table 22. Both compositions are based on the same polymer. Table 22, below, shows the antioxidant composition as analysed before ageing, whereas the concentration of SHT is the concentration as added, and was not analysed.

TABLE 22

| | Polymer | | AO1010 (ppm) | AO1330 (ppm) | SHT (ppm) |
| --- | --- | --- | --- | --- | --- |
| P5 | BEunstab powder | α- nucleated polypropylene homo-polymer | 0 | 4500 | 1000 |
| P10 | BEunstab powder | α- nucleated polypropylene homo-polymer | 0 | 4400 | 0 |

Initially Samples P5 and P10 were aged in a piperazine/AMP solution (0.45 M piperazine+0.9 M AMP)(pH-12.5) at 95° C., for 12 weeks. The remaining antioxidants are as shown in Table 23, below.

TABLE 23

| | Polymer | | AO1010 (ppm) | AO1330 (ppm) |
| --- | --- | --- | --- | --- |
| P5 | BEunstab powder | α- nucleated polypropylene homo-polymer | 0 | 3270 |
| P10 | BEunstab powder | α- nucleated polypropylene homo-polymer | 0 | 3300 |

These pre-aged samples were placed in an oven at 130° C., with circulated air (i.e. higher temperature and easier access to oxygen compared to the ageing in piperazine+AMP solution) and visually inspected until 14 weeks of ageing at 130° C., then the samples were mechanical tensile tested.

c) The Effect of Piperazine+AMP on Antioxidants and Polymer 1 mm thick samples of Sample P3 (PP polymer with no added antioxidants) were aged in air, water and a piperazine/AMP solution (0.45 M piperazine+0.9 M AMP)(pH-12.5) at 95° C. until eventually brittle failure, and the samples aged for 32 weeks in piperazine+AMP extra aged at 130° C. until brittleness. The samples were visually inspected and bended 180° each week until failure.

Tensile Testing—According to ISO 527-2

Instrument Zwick Z010 with Macro extensometer

Specimen type Multipurpose type 1B, Compression moulded and milled, thickness 8 mm Test conditions Testing speed 50 mm/min.

Tensile modulus 1 mm/min

Definitions

Tensile modulus, MPa—(the modulus of elasticity in tension)—the slope of a secant line between 0.05% and 0.25% strain on a stress-strain curve.

Tensile stress/strain at yield, MPa/%—tensile stress/strain corresponding to the yield point (an increase in strain does not result in an increase in stress).

Tensile strain at break, %—tensile strain corresponding to the point of rupture

Tensile stress at break, MPa—tensile stress corresponding to the point of rupture Results and Discussions Table 24, below, shows the time until the first visual sign of surface degradation of the samples P1, P2, P5 and P10 given in days at 130° C. ageing in air after the samples have been pre-aged in the above mentioned mixture of piperazine/AMP solution (0.45 M piperazine+0.9 M AMP)(pH-12.5) for the above identified time periods.

TABLE 24

| Sample | Time until first visual sign of surface degradation (days) |
|---|---|
| P1 | 72 |
| P2 | >96 |
| P5 | >96 |
| P10 | >96 |

Figure 11:
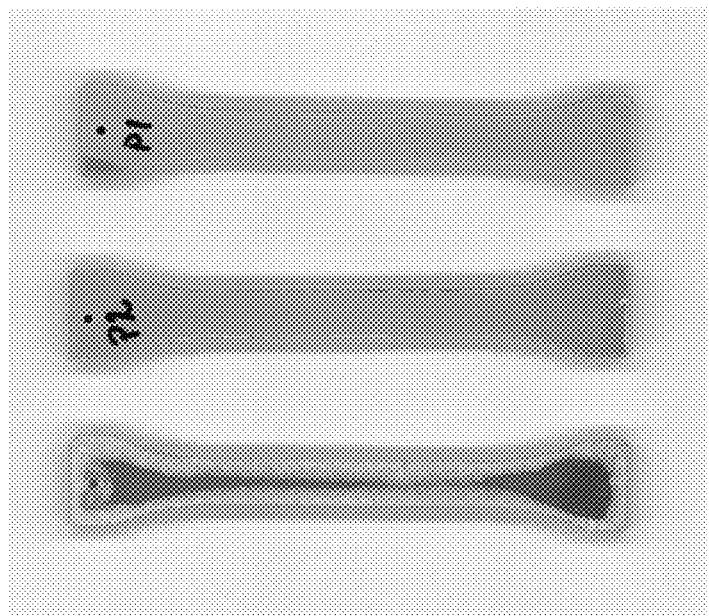

The first sign of surface degradation of Sample P1 after 72 days are shown in FIG. 11, together with Sample P2 aged for 86 days, and Sample 3 (PP without added antioxidant, pre-aged in 32 weeks in piperazine/AMP solution (0.45 M piperazine+0.9 M AMP)(pH-12.5) and first sign of surface degradation after 12 days at 130° C., and totally brittle after 24 days at 130° C., as shown in FIG. 11.

FIG. 25, below, shows the change in mechanical properties of Samples P2, P1, P5 and P10 as a function of

TABLE 25

| Time in Piperazine + AMP at 95° C. | Time in air at 130° C. | Sample | Tens. Mod. (Mpa) | Stress at yield (Mpa) | Strain at yield (%) | Stress at break (Mpa) | Strain at break (%) |
|---|---|---|---|---|---|---|---|
| Ref | — | P2 | 1320 | 32 | 8 | 16 | 103 |
| 8 weeks | — | P2 | 1330 | 30 | 12 | 21 | 85 |
| 52 weeks | — | P2 | 1310 | 31 | 12 | 17 | 84 |
| 52 weeks | 4 weeks | P2 | 1390 | 31 | 11 | 16 | 78 |
| 52 weeks | 14 weeks | P2 | 1370 | 32 | 10 | 20 | 64 |
| Ref | — | P1 | 1425 | 31 | 8 | 22 | 190 |
| 8 weeks | — | P1 | 1400 | 30 | 11 | 23 | 200 |
| 36 weeks | — | P1 | 1305 | 30 | 14 | 19 | 110 |
| 36 weeks | 4 weeks | P1 | 1290 | 29 | 14 | 17 | 76 |
| 36 weeks | 14 weeks | P1 | 1110 | 30 | 14 | 20 | 76 |
| Ref | — | P5 | 2080 | 39 | 5 | 24 | 18 |
| 12 weeks | 4 weeks | P5 | 1850 | 37 | 5 | 26 | 22 |
| 12 weeks | 14 weeks | P5 | 2060 | 37 | 4 | 28 | 20 |
| Ref | — | P10 | 2080 | 40 | 5 | 24 | 17 |
| 12 weeks | 4 weeks | P10 | 1840 | 37 | 5 | 26 | 34 |
| 12 weeks | 14 weeks | P10 | 2090 | 37 | 4 | 28 | 22 | a) Sample P1 and P2

Figure 12:
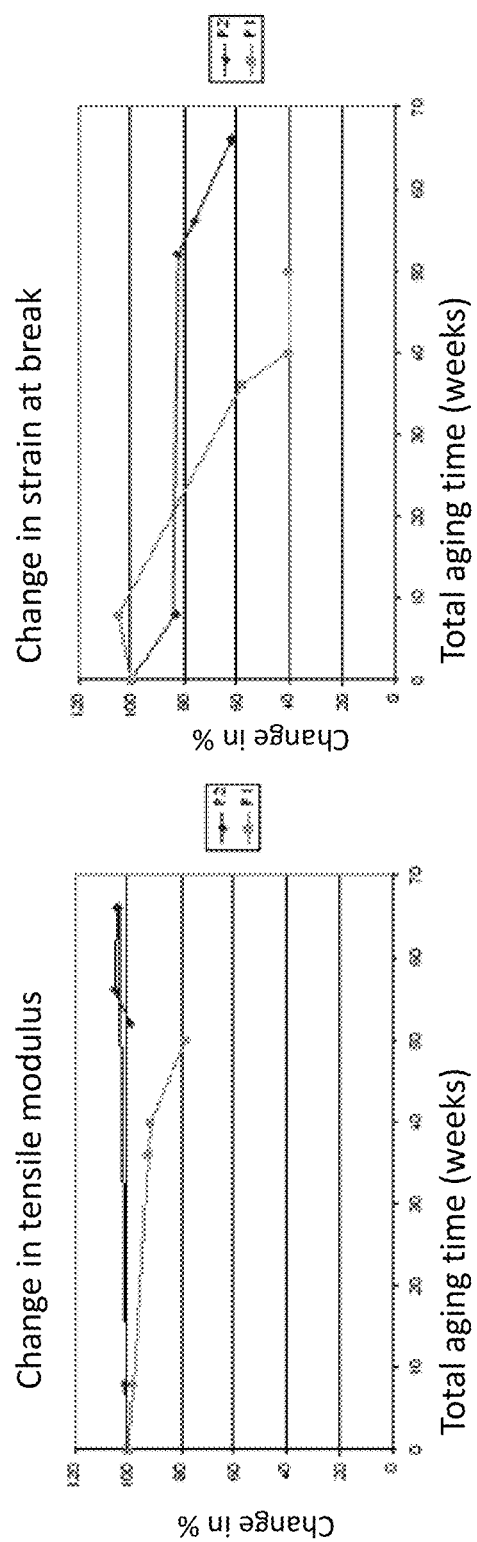
FIG. 12 illustrates the change of tensile modulus and strain at break as a function of ageing of samples.

The mechanical properties as shown in Table 25 shows little variations during ageing of Stress at yield, Strain at yield and stress at break of both P1 and P2. The Tensile modulus and Strain at break as a function of ageing are seen as shown in FIG. 12.

The reduction in Tensile modulus and Strain at break of Sample P1 clearly shows that polymer degradation has started and most probably resulted in a totally brittle polymer after few extra weeks ageing at 130° C. as seen for Sample P3 with no added antioxidant (FIG. 2). In the literature often 50% reduction in Strain at break is used as failure criteria for ageing of polymers. P1 is reduced by 60% after 36 weeks in piperazine+AMP at 95° C.+4 weeks at 130° C. The same properties in P2, after longer time of ageing are less changed, most probably due to the much better stabilization system in P2.

Figure 13:
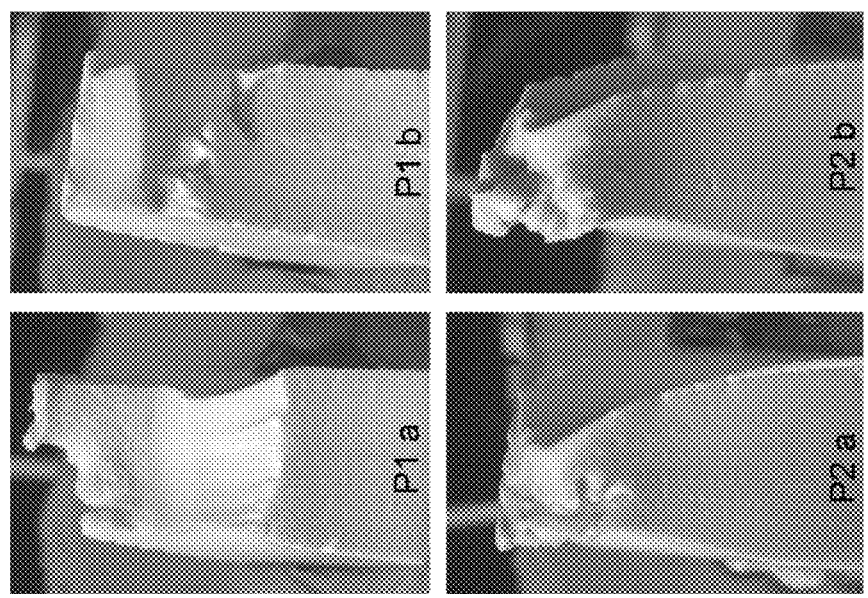
FIG. 13 illustrates fracture surfaces of test specimens after ageing in amine solution.

In FIG. 13 the fracture surfaces of Sample P1 after 36 weeks in piperazine+AMP at 95° C.+14 weeks at 130° C. as well as Sample P2 after 52 weeks in piperazine+AMO at 95° C.+14 weeks at 130° C., after tensile testing until break. The picture shows a partly brittle fracture of P1 and some degraded polymer close to the surface (upper left P1a), whereas Sample 2 showed a more ductile behaviour and no sign of surface degradation was seen b) Samples P5 and P10

The only difference in composition between Sample P5 and P10 is the 1000 ppm of SHT in Sample P5. The results in Tables 23-25 shows that the remaining IRGANOX 1330 concentration after 12 weeks ageing in piperazine+AMP is the same and 14 weeks extra ageing at 130° C. shows no surface degradation or change in mechanical properties, i.e. the ageing time is too short to distinguish between these two Samples.

c) The Effect of Piperazine+AMP on Antioxidants and Polymer

The results after ageing of 1 mm thick unstabilised PP (Sample P3) at different conditions are shown in Table 6.

TABLE 26

| Sample | Ageing conditions | Time until first surface degradation | Time until brittle failure |
|---|---|---|---|
| P3 | Water, 95° C. | 15 weeks | 21 weeks |
| P3 | Air, 95° C. | 16 weeks | 17 weeks |
| P3 | Piperazine + AMP, 95° C. | >32 weeks | >32 weeks |
| P3 | Air, 130° C. after 32 week in pierazine + AMP | 12 days | 12 days |

Table 6, Time until first surface degradation and brittleness of P3 in different media The results show that time until first sign of surface degradation (yellow spots) was almost the same for unstabilised PP at 95° C. both in water and air. However, the time until brittle failure was quicker in air than in water.

The results in Table 6 also show that the amine solution comprising piperazine+AMP has a stabilising effect on polypropylene with no sign of surface degradation after 32 weeks in piperazine/AMP solution (0.45 M piperazine+0.9 M AMP)(pH-12.5) at 95° C. However, after removing Sample P3 from piperazine+AMP to 130° C. in air the sample failed after few days (12 days).

The results tells that piperazine+AMP has a negative effect on depletion of the antioxidant IRGANOX 1010 (as seen for Sample P1) compared with depletion of IRGANOX 1010 in water (both pH 4.5, pH 7 and pH 12.5). The reason may be that the amine composition comprising piperazine+AMP slightly swell the polymer and may also bring some water into the polymer, and the IRGANOX 1010 molecule may be hydrolysed inside the polymer. For PP polymers stored in water hydrolysis of IRGANOX 1010 is reported to happen at the surface, i.e. less AO 1010 hydrolysed and slower depletion of IRGANOX 1010. This again shows that it is important to choose the right stabilisation of polypropylene. At the same time all test results of Sample P2 shows that the antioxidant system of P2 gives very good long term properties in amine solutions with estimated service lifetime in piperazine+AMP at 95° C. for 20 years, and for sure >30 years at 80° C.

CONCLUSIONS

The first sign of polymer degradation of Sample P1 is seen after 36 weeks in piperazine+AMP at 95° C. plus 72 days at 130° C. in air.

No sign of polymer degradation of Sample P2 after 52 weeks in piperazine+AMP at 95° C. plus 96 days at 130° C. in air.

The time at 130° C. (96 days) was too short to distinguish between Sample P5 and P10 to see the real effect of SHT Piperazine+AMP has a negative effect on depletion of the antioxidant IRGANOX 1010

Piperazine+AMP has a stabilising (antioxidant) effect on polypropylene

Depletion of Antioxidant as a Function of Time in Aqueous Solutions

Figure 14:
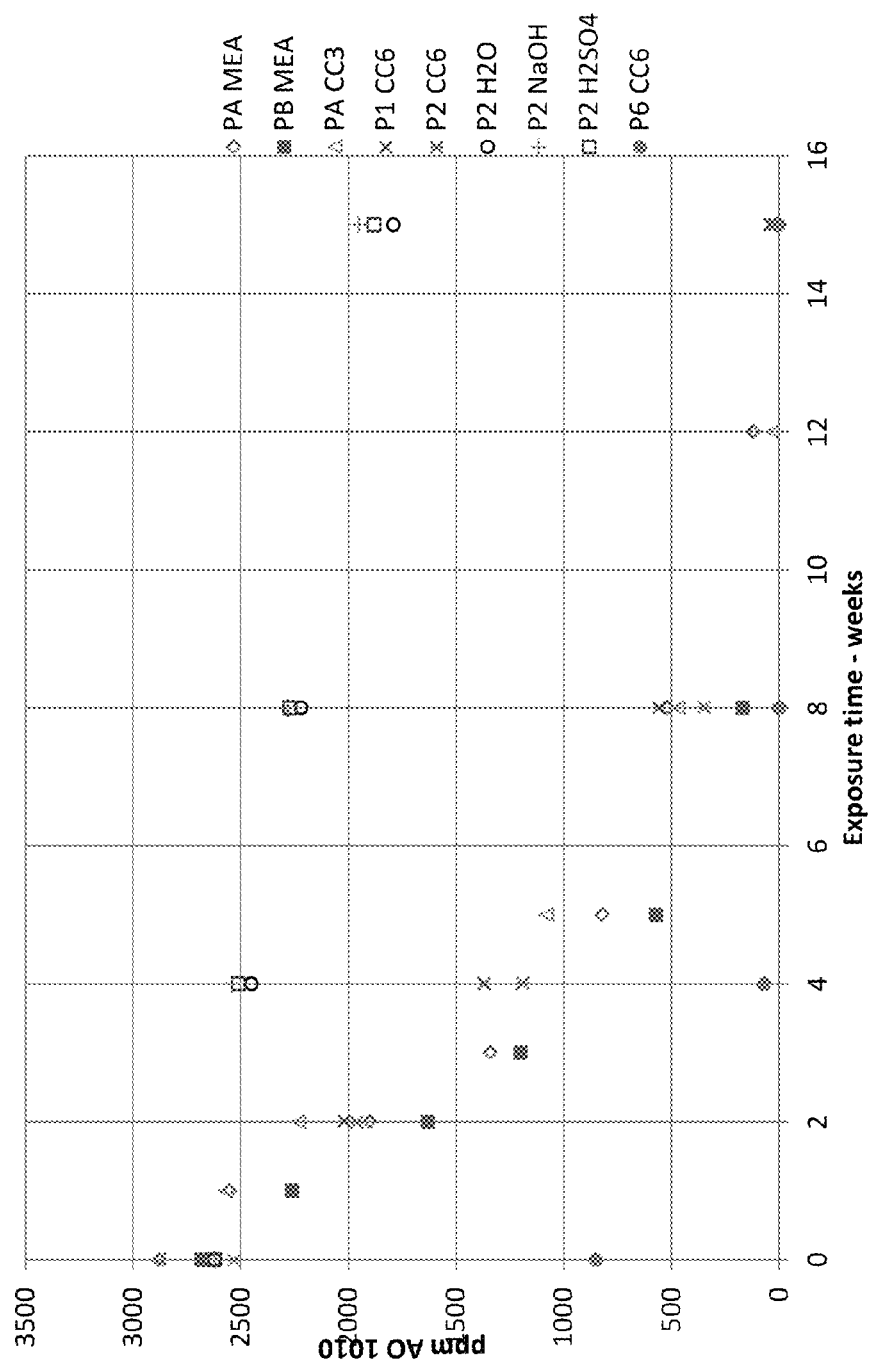
FIG. 14 illustrates depletion of IRGANOX1010 as a function of time soaked in different solutions.
Figure 15:
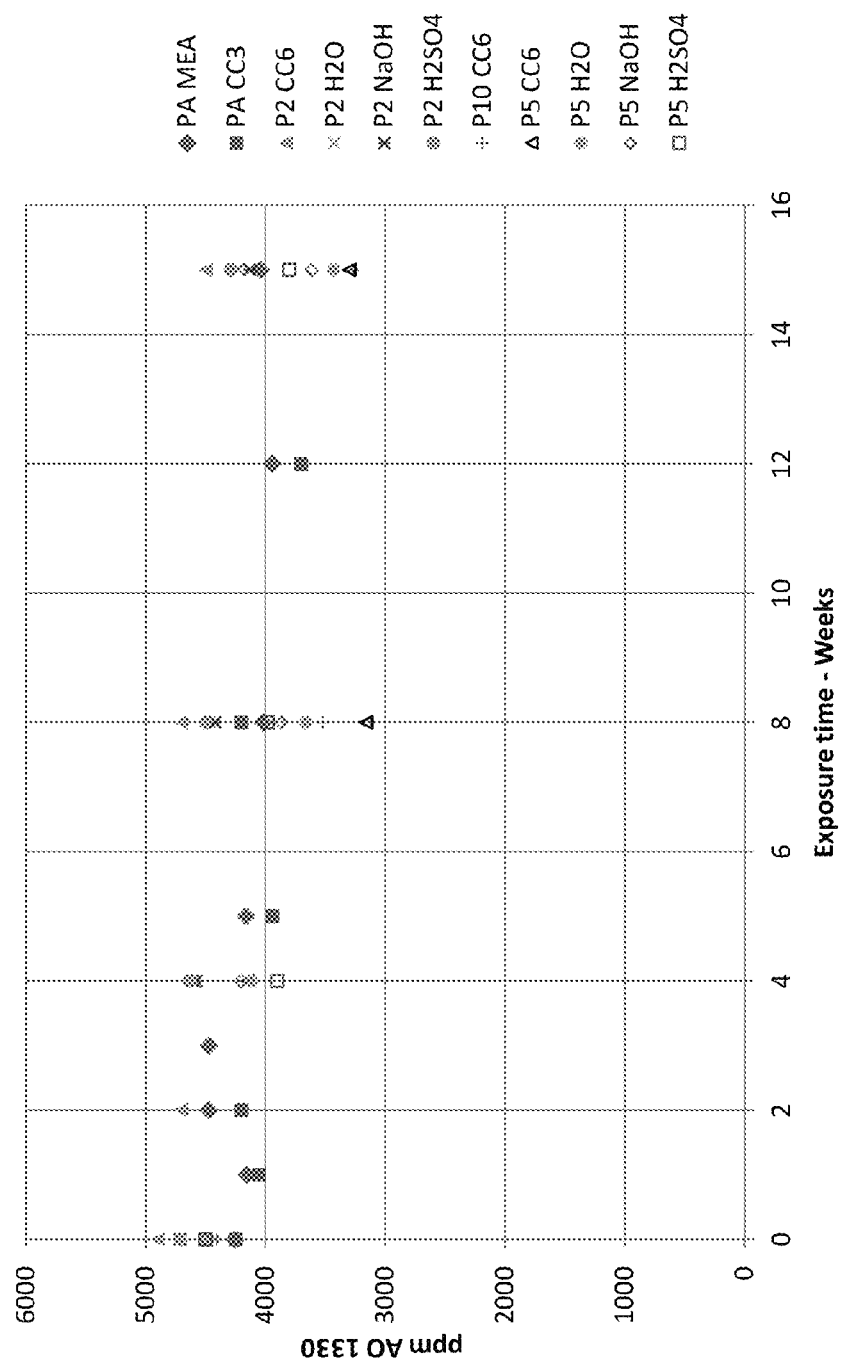
FIG. 15 illustrates depletion of IRGANOX1330 as a function of time soaked in different solutions.

Results obtained for antioxidant depletion in test specimens P1 and P3 as indicated above, as a function of time in different aqueous solutions are given in FIGS. 14 and 15, showing the depletion of IRGANOX 1010 and IRGANOX 1330, respectively, in water, and in aqueous solutions of MEA, AMP+AEP, AMP+piperaxine, NaOH and $H_2SO_4$. All tests were performed at 95° C. in the indicated solution. The results are taken both from examples above and from separate tests, performed as described above, and the results are collected in the mentioned figures.

It is known that the polyolefin is not exposed to thermal degradation resulting in loss of mechanical properties as long as the phenolic antioxidants, such as IRGANOX 1010 or IRGANOX 1330 are present in the polymer mixture. Depletion of the antioxidants are thus an indication of undesired loss of required properties for the polymers.

It can be seen from FIGS. 14 and 15 that IRGANOX 1010 is depleted more rapidly from the polyolefin by the tested amine solutions than by water or acidic or basic water, even if the pH of the basic water is the same as for the amine solutions. All IRGANOX 1010 is depleted from the polymer after 15 weeks, whereas IRGANOX 1330 remains substantially unaltered during the same period.

The finding that IRGANOX 1330 remains substantially unaltered for 15 weeks when soaked in amine solutions at 95° C. indicates that the antioxidant remains in the polypropylen for a sufficiently long period under the running conditions in a plant for $CO_2$ capture. This result is not expected from the findings in the above identified article of Müller et al, which reports on a far more rapid depletion of IRGANOX 1330 from the polymers tested therein.

Possible explanations on the unexpectedly long time before total depletion of IRGANOX 1330 from the tested polypropylene, may be the specific composition of additives in the tested polymer, interaction with SHT, or differences in the polypropylene polymer. Further tests on lifetime that my give answers to this questions, are being performed.

The invention claimed is:

1. A construction element for a plant for capture of an acidic gas using an aqueous amine absorbent, wherein at least a part of a surface of said construction element comprises a polypropylene composition;

wherein the polypropylene composition comprises:

a hydrolytically stable antioxidant stable in amine solutions, of formula

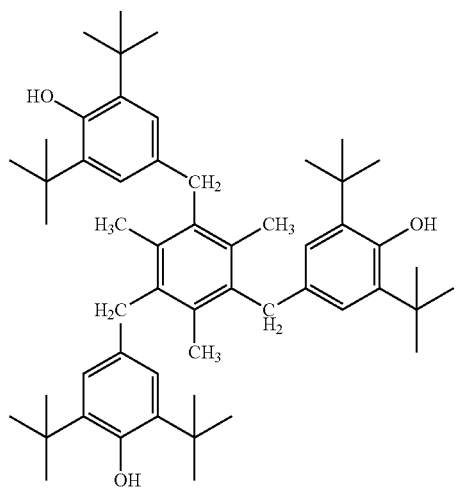 [SMILES: Cc1c(Cc2cc(C(C)(C)C)c(O)c(C(C)(C)C)c2)c(C)c(Cc2cc(C(C)(C)C)c(O)c(C(C)(C)C)c2)c(C)c1Cc1cc(C(C)(C)C)c(O)c(C(C)(C)C)c1]

1,3,5-tri-methyl-2,4,6-tris-(3,5-di-tert. butyl-4-hydroxyphenyl) benzene; and a heat stable antioxidant of formula (IIIb)

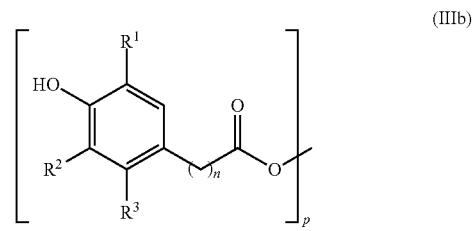

wherein
$R^1$ is $C_{1-18}$ alkyl, $C_{5-12}$ cycloalkyl, phenyl or $C_{7-9}$ phenylalkyl;
$R^2$ is hydrogen, $C_{1-18}$ alkyl, $C_{5-12}$ cycloalkyl, phenyl or $C_{7-9}$ phenylalkyl;
$R^3$ is hydrogen or methyl;
n is 0 or an integer from 1 to 6; and
p is an integer from 2 to 6.

2. The construction element as claimed in claim 1, wherein said heat stable antioxidant is

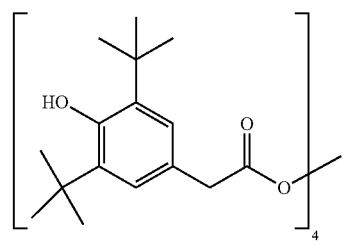

3. The construction element as claimed in claim 1, further comprising one or more of an organic phosphite or phosphonite antioxidant, and/or a sulphoether antioxidant.

4. The construction element as claimed in claim 1, wherein the propylene polymer comprises a beta-crystalline phase.

5. The construction element as claimed in claim 1, further comprising synthetic hydrotalcite.

6. The construction element as claimed in claim 1, wherein said construction element is constructed of concrete, metal or composite material.

7. The construction element as claimed in claim 1, wherein the surface thereof expected to being exposed to the aqueous amine absorbent, amine vapour and/or steam is coated with said polypropylene composition.

8. The construction element as claimed in claim 1, wherein the surface thereof expected to being exposed to aqueous amine solution, vapour thereof or steam is a liner comprising said polypropylene composition which is fixed to the surface of the construction element.

9. The construction element as claimed in claim 1, wherein the construction element is an absorption column, a desorption column, a tube, a liner, a tray, or a column packing element.

10. A liner for a construction element, the liner comprising a polypropylene composition comprising a hydrolytically stable antioxidant stable in amine solutions, of formula

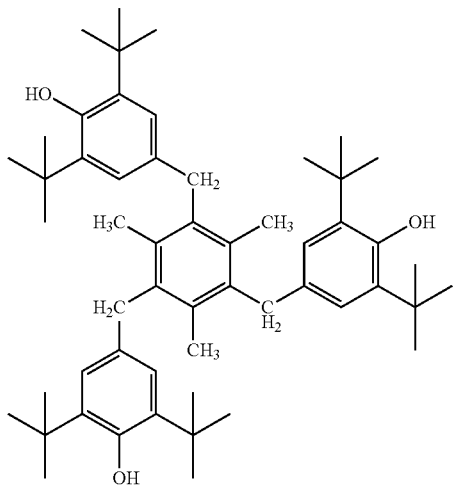 [SMILES: Cc1c(Cc2cc(C(C)(C)C)c(O)c(C(C)(C)C)c2)c(C)c(Cc2cc(C(C)(C)C)c(O)c(C(C)(C)C)c2)c(C)c1Cc1cc(C(C)(C)C)c(O)c(C(C)(C)C)c1]

1,3,5-tri-methyl-2,4,6-tris-(3,5-di-tert. butyl-4-hydroxyphenyl) benzene; and a heat stable antioxidant of formula (IIIb)

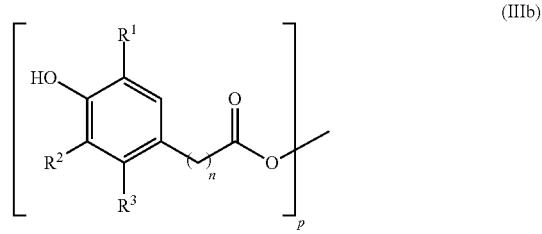

wherein $R^1$ is $C_{1-18}$ alkyl, $C_{5-12}$ cycloalkyl, phenyl or $C_{7-9}$ phenylalkyl;

$R^2$ is hydrogen, $C_{1-18}$ alkyl, $C_{5-12}$ cycloalkyl, phenyl or $C_{7-9}$ phenylalkyl;

$R^3$ is hydrogen or methyl;

n is 0 or an integer from 1 to 6; and p is an integer from 2 to 6.

11. The liner as claimed in claim 10 having a thickness of 0.5 to 100 mm.

12. A method for capturing an acidic gas in an exhaust gas comprising: contacting said exhaust gas with an aqueous amine absorbent in an absorption column according to claim 9.

13. An apparatus for capturing acidic gas, wherein said apparatus comprises a construction element as claimed in claim 1.

* * * * *